(12) United States Patent
Furumi et al.

(10) Patent No.: US 6,381,527 B1
(45) Date of Patent: Apr. 30, 2002

(54) CONTROL UNIT FOR REAR-WHEEL STEERING APPARATUS

(75) Inventors: Hiroshi Furumi; Kunio Shirakawa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/680,367

(22) Filed: Oct. 5, 2000

(30) Foreign Application Priority Data

Oct. 13, 1999 (JP) ............................................. 11-291670
Aug. 29, 2000 (JP) ....................................... 2000-259085

(51) Int. Cl.$^7$ ............................................... B62D 5/00
(52) U.S. Cl. .......................................... 701/41; 180/445
(58) Field of Search ...................... 701/41, 72; 180/445, 180/408, 413, 410, 236; 280/91.1

(56) References Cited

U.S. PATENT DOCUMENTS 4,926,955 A * 5/1990 Ohmura et al. ............. 180/140
6,041,886 A * 3/2000 Nakaishi et al. ............ 180/444

FOREIGN PATENT DOCUMENTS

JP        2000-79881        6/1999

* cited by examiner

Primary Examiner—William A. Cuchlinski, Jr.
Assistant Examiner—Arthur D. Donnelly
(74) Attorney, Agent, or Firm—Merchant & Gould P.C.

(57) ABSTRACT

Controller is designed to control operation of a rear-wheel steering apparatus typically provided in a four-wheel steering vehicle, and is based on electronic circuitry. In the electronic circuitry, a target-steering-angle setting section sets a target steering angle of the rear wheels. Actual-steering-angle measurement section measures an actual steering angle of the rear wheels. On the basis of the target steering angle and actual steering angle, a steering-angle adjustment section generates a motor drive signal to control the rotation of the motor in such a manner that a difference or offset between the target steering angle and the actual steering angle becomes zero. On condition that the motor is in a predetermined driving state, a motor-deceleration-amount calculation section is activated to calculate an actual rotating speed of the motor on the basis of the actual steering angle of the rear wheels and compares the calculated actual rotating speed of the motor with a prestored reference rotation speed. The motor-deceleration-amount calculation section operates to calculate a motor-rotation deceleration amount when the compared result indicates that the calculated actual rotating speed is higher than the reference rotation speed.

11 Claims, 18 Drawing Sheets

CONTROL UNIT FOR REAR-WHEEL STEERING APPARATUS

BACKGROUND OF THE INVENTION

1. Field of the Invention

The present invention relates generally to controller units for rear-wheel steering apparatus and, more particularly, to an electronic controller module or unit which achieves improved behavior of rear-wheel steering apparatus in vehicles, typically four-wheel steering (4WS) automotive vehicles, that are designed to steer rear wheels in association with steering of front wheels.

2. Description of the Related Art

Hitherto, four-wheel steering vehicles have been known and used popularly. The four-wheel steering vehicles are arranged to change the steering direction of the rear wheels simultaneously with steering of the front wheels in response to a manual steering maneuver of the steering wheel by a human vehicle operator or driver. During high-speed travel of the vehicle, for example, the four-wheel steering allows the vehicle to make lane changes with sufficient stability by steering the rear wheels in the same direction as the front wheels. Also, when the vehicle is traveling at low speed in a narrow space, the four-wheel steering allows the vehicle to make a small left or right turn by steering the rear wheels in an opposite direction to the front wheels. Steering direction of the rear wheels relative to a steering direction of the front wheels depends on an intended purpose of the vehicle travel (i.e., traveling speed of the vehicle, steering angle of the front wheels, etc.). Generally, every four-wheel steering vehicle includes, in addition to a front-wheel steering apparatus, a separate rear-wheel steering apparatus that steers the rear wheels, in response to a steering maneuver of the steering wheel by the vehicle operator, in association with steering of the front wheels. The rear-wheel steering apparatus constitutes an essential part of the four-wheel steering vehicles.

Basic construction and operation of the conventionally-known rear-wheel steering apparatus is outlined as follows. Two rear wheels, located on both sides of a rear body portion of the four-wheel vehicle, are connected, via knuckle arms (also called steering arms) or other connecting mechanism, to opposite ends of a single rear-wheel steering rod disposed in a widthwise direction of the vehicle. There are also provided steering-rod actuating mechanisms for moving the rear-wheel steering rod axially in a leftward or rightward direction and a drive operatively connected with the steering-rod actuating mechanisms. Namely, the rear wheels are operatively connected to the drive via the rear-wheel steering rod. When the rear-wheel steering rod is at a central neutral position with its axial midpoint substantially coinciding with the longitudinal centerline of the vehicle, the rear wheels are directed straight ahead in parallel to the longitudinal centerline of the vehicle. As the rear-wheel steering rod is moved axially leftward or rightward by the drive via the steering-rod actuating mechanisms, the two rear wheels are caused to pivot in a direction opposite to the axial movement direction of the rear-wheel steering rod.

The following paragraphs describe in greater detail an example of the conventional rear-wheel steering apparatus for accurate understanding of the construction and operation of the rear-wheel steering apparatus, with reference to the accompanying drawings. Specifically, FIGS. 16 to 22 schematically show principal parts of the rear-wheel steering apparatus proposed earlier by the assignee of the present application. More specifically, FIGS. 16 to 22 outline the rear-wheel steering apparatus disclosed in Japanese Patent Application No. HEI-11-169609, which was filed on Jun. 16, 1999 and then laid open as Japanese Patent Laid-open Publication No. 2000-79881. The present invention is directed to providing solutions to the inconveniences that would be encountered by the earlier-disclosed rear-wheel steering apparatus. The inconveniences of the earlier-disclosed rear-wheel steering apparatus will be explained below with reference FIGS. 16 to 22.

More specifically, FIG. 16 is an exploded perspective view of the earlier-disclosed rear-wheel steering apparatus. The rear-wheel steering apparatus, generally represented at reference numeral 400, includes a screw shaft 421 extending parallel to the above-mentioned rear-wheel steering rod 440. Threaded direction of the screw shaft 421 is reversed at its axial midpoint; that is, the screw shaft 421 includes left-handed and right-handed thread sections 421L and 421R. The screw shaft 421, having such left-handed and right-handed thread sections 421L and 421R, is driven by an electric motor 411, by way of a speed reduction mechanism 417, to rotate in the clockwise or counterclockwise direction. Left and right slide blocks 420L and 420R are mounted on the screw shaft 421; more specifically, lower portions of these left and right slide blocks 420L and 420R mesh with the screw shaft 421 by female-thread/male-thread engagement. By the clockwise or counterclockwise rotational movement and threaded engagement with the left and right slide blocks 420L and 420R, the screw shaft 421 functions as a drive shaft for moving the left and right slide blocks 420L and 420R in parallel to the shaft 421, as will be later described more fully with reference to FIGS. 18 and 19. Center piece 441 is fixedly mounted at the axial center of the rear-wheel steering rod 440, and the left and right slide blocks 420L and 420R are positioned adjacent opposite ends of the center piece 441 on the steering rod 440. The rear-wheel steering rod 440 are threaded through holes formed in respective upper portions of the left and right slide blocks 420L and 420R.

Clutch mechanisms 430L and 430R are attached to the left and right slide blocks 420L and 420R, respectively. Turning on the clutch mechanisms 430L and 430R causes the left and right slide blocks 420L and 420R to be operatively connected to the rear-wheel steering rod 440 that is threaded through the holes in the slide blocks 420L and 420R with the clutch mechanisms 430L and 430R interposed therebetween. Turning off the clutch mechanisms 430L and 430R, on the other hand, cancels the operative connection between the left and right slide blocks 420L and 420R and the rear-wheel steering rod 440. In this prior art rear-wheel steering apparatus, however, only either one of the slide blocks 420L and 420R is actually connected to the rear-wheel steering rod 440 with the other slide block 420R or 420L left disconnected from the steering rod 440; note that both of the left and right slide blocks 420L and 420R are never simultaneously connected to the rear-wheel steering rod 440.

The above-mentioned clutch mechanisms 430L and 430R each have an actuating lever 424L or 424R projecting outwardly from a clutch ring 432L or 432R in a direction substantially perpendicular to the axis of the rear-wheel steering rod 440. The actuating levers 424L and 424R are movable within and along a guide groove 431 as shown in FIG. 17 that is formed in a casing (not shown). Namely, horizontal groove portions of the guide groove 431 allows the actuating levers 424L and 424R to move within a predetermined horizontal range parallel to the screw shaft 421; thus, the horizontal movement of the actuating levers 424L and 424R parallel to the screw shaft 421 is limited by the length of the horizontal groove portions so that the levers 424L and 424R are horizontally movable only within the predetermined range along the screw shaft 421. Further, as clearly seen from FIG. 17, the actuating levers 424L and 424R can be moved, by activation of electrically-operated actuators 425L and 425R, along vertical groove portions of the guide groove 431 only when the left and right slide blocks 420L and 420R are at respective central or neutral positions corresponding to the axial midpoint portion of the screw shaft 421. In FIG. 17, both of the left and right slide blocks 420L and 420R are shown as resting at the uppermost positions within the corresponding vertical groove portions of the guide groove 431, in which situation the slide blocks 420L and 420R are completely prevented from moving parallel to the screw shaft 421.

The above-described construction governs the behavior of the clutch mechanisms 430L and 430R and the left and right slide blocks 420L and 420R associated with the clutch mechanisms 430L and 430R. The rear-wheel steering rod 440 is movable axially in response to the movement of the left or right slide block 420L or 420R along the screw shaft 421.

As further shown in FIG. 16, a follow-up mechanism 426 is disposed above the center piece 441, which operates to trace the axial movement of the rear-wheel steering rod 440. Steering stroke sensor 427 functions to detect a direction and amount (traveling distance) of the axial movement of the rear-wheel steering rod 440 via the follow-up mechanism 426. There is provided another follow-up mechanism 428 in association with one of the left and right slide blocks 420L and 420R (left slide block 420L in the illustrated example), which operates to trace the movement of the slide blocks 420L and 420R. Drive stroke sensor 429 functions to detect a direction and amount (traveling distance) of the axial movement of the left and right slide blocks 420L and 420R.

FIG. 16 also shows an inner stopper 491 that is located in a lower portion of the rear-wheel steering apparatus 400 and projects upward from the inner surface of the not-shown casing. This inner stopper 491 is provided for defining the neutral positions of the left and right slide blocks 420L and 420R; that is, the inner stopper 491 allows the slide blocks 420L and 420R to stop accurately at the respective neutral positions in a return-to-neutral stroke after rear-wheel steering outward movement.

FIGS. 18 and 19 are schematic top plan views of the rear-wheel steering apparatus 400, where reference numerals 444 and 445 represent left and right rear wheels. The bottom-to-top direction in these figures corresponds to a direction in which the vehicle travels straight ahead, i.e. vehicle's straight-ahead traveling direction. Specifically, FIG. 18 shows each of the left and right rear wheels 444 and 445 having been turned left by an angle θ relative to the straight-ahead traveling direction of the vehicle, while FIG. 19 shows each of the left and right rear wheels 444 and 445 being directed straight ahead or placed at a neutral position (θ=0) to thereby allow the vehicle to travel straight forward.

As the screw shaft 421 is rotated in one particular direction by the electric motor 411, the left and right slide blocks 420L and 420R are simultaneously moved outwardly, away from each other, by the action of the left-handed and right-handed thread sections 421L and 421R. As the screw shaft 421 is rotated in the other direction reverse to that particular direction by the motor 411, the left and right slide blocks 420L and 420R are simultaneously moved inwardly, toward each other, by the action of the left-handed and right-handed thread sections 421L and 421R. Thus, by turning on the clutch mechanism 430R before the right slide block 420R is moved outward (rightward in FIG. 18) from the central neutral position, the slide block 420R can be brought into engagement with the rear-wheel steering rod 440, so that the steering rod 440 can be moved rightward together with the rightward movement of the right slide block 420R via the screw shaft 421. By such rightward movement of the rear-wheel steering rod 440, the left and right rear wheels 444 and 445 are turned left by a steering angle θ by means of the left and right knuckle arms 442 and 443, as shown in FIG. 18.

When the left and right slide blocks 420L and 420 R, having been displaced outward away from each other as shown in FIG. 18, are to be returned to their respective neutral positions so that the steering angle θ of the left and right rear wheels 444 and 445 becomes zero as shown in FIG. 19, the motor 411 is rotated in the reverse direction to cause the screw shaft 421 to also rotate in the reverse direction. By the reverse rotation of the screw shaft 421, the left and right slide blocks 420L and 420 R are simultaneously moved inwardly toward each other, and thus the rear-wheel steering rod 440 engaging with the right slide block 420R is moved leftward back to its neutral position, as a result of which the left and right rear wheels 444 and 445 are returned to the straight-ahead, neutral position.

When the left and right slide blocks 420L and 420 R are simultaneously moved inwardly toward their respective neutral positions, they are ultimately brought into contact with and pressed against the left and right end surfaces, respectively, of the inner stopper 491 as denoted by arrows 498 and 499 in FIG. 19. Thus, the movement of the left and right slide blocks 420L and 420R toward each other is limited by the inner stopper 491 so that the two blocks 420L and 420 R can be mechanically stopped at their respective neutral positions. At that time, the left slide block 420L also contacts the left end surface of the center piece 441 so that further movement of the slide block 420L is prevented by the center piece 441. This way, when the rear-wheel steering rod 440 is at any other position than its neutral position due to a steering maneuver by the vehicle operator, the steering rod 440 can be accurately moved back to the neutral position by just rotating the motor 411 in the reverse direction.

Similarly to the right slide block 420R, the left slide block 420L can be brought into operative engagement with the rear-wheel steering rod 440 by turning on the associated clutch mechanism 430L, so that the left and right rear wheels 444 and 445 can be turned right and then returned to the straight-ahead, neutral position.

The prior art rear-wheel steering apparatus arranged in the above-described manner would present the following disadvantages.

When the rear wheels 444 and 445 having been turned left or right are to be returned to the straight-ahead position, the left and right slide blocks 420L and 420R are sometimes returned to their respective neutral positions at high speed, for example, in response to a quick steering maneuver by the vehicle operator. If the return-to-neutral movement of the slide blocks 420L and 420R by the screw shaft 421 is too quick, the screw shaft 421 tends to rotate excessively by an inertial rotating force of the motor 411 when the slide blocks 420L and 420R are about to abut against and thereby stop at the inner stopper 491. As a result of the excessive rotation, the screw shaft 421 would be forced excessively into the threaded holes of the slide blocks 420L and 420R as illustratively shown in FIGS. 20 to 22.

FIG. 20 shows an enlarged fragmentary view showing the right slide block 420R having been brought into contact with and pressed against the right end surface of the inner stopper 491. Namely, as the screw shaft 421 is rotated in the reverse direction (i.e., the direction denoted by arrow 451) to move back the right slide block 420R leftward (i.e., the direction denoted by arrow 499), the right slide block 420R is brought into contact with and then pressed against the right end surface of the inner stopper 491 at its neutral position. FIGS. 21 and 22 show, on a somewhat magnified scale, a portion encircled by a dot-and-dash line in FIG. 20 and more particularly explain an inconvenience of the above-discussed prior art rear-wheel steering apparatus.

More specifically, FIGS. 21 and 22 show relationship between female (or internal) thread portions 453 of the right slide block 420R and male (or external) thread portions 454 of the right-handed thread section 421R of the screw shaft 421. If the screw shaft 421 stops rotating as soon as the right slide block 420R abuts against the inner stopper 491, then there would occur no undesired distortion of the male thread portions 454, as seen in FIG. 21. However, if, due to the inertial rotating force of the motor 411, the screw shaft 421 fails to fully stop rotating immediately when the right slide block 420R abuts against the inner stopper 491, then there would occur an undesired distortion of the male thread portions 454, as seen in FIG. 22. The thus-distorted male thread portions 454 of the screw shaft 412 tends to be jammed between the female thread portions 453 of the right slide block 420R to the extent that they can not be readily disengaged from the female thread portions 453. Consequently, the rotation of the screw shaft 421 can not be resumed smoothly, or can not be resumed at all, next time the rear wheels are to be steered.

The preceding paragraph has explained the distortion and interlocking jam of the male thread portions 454 of the right-handed thread section 421R of the screw shaft 421 that would occur in returning the rear wheels to the straight-ahead, neutral position. In effect, however, a similar interlocking jam between the female and male thread portions 453 and 454 would be encountered, due to the inertial operation of the motor 411, even when the rear wheels are turned right or left to a predetermined steered position corresponding to a steering angle intended or designated by the vehicle operator, because the slide blocks 420L and 420R moving outward by the screw shaft 421 are stopped mechanically by being engaged by outer stoppers that project from the inner surface of the not-shown casing similarly to the above-mentioned inner stopper 491.

To avoid the interlocking jam between the female and male thread portions 453 and 454 when the slide blocks 420L and 420R are moved to left and right outward positions corresponding to a designated steering angle of the rear wheels or returned to the neutral positions after the outward movement, it is necessary that the screw shaft 421 with the male thread portions 454 have a sufficiently great outer diameter and the left and right slide blocks 420L and 420R have a sufficiently great inner diameter and that the male thread portions 454 and female thread portions 453 have increased rigidity. However, the increases in the outer diameter of the screw shaft 421, inner diameter of the slide blocks 420L and 420R and rigidity of the thread portions 453 and 454 would unavoidably lead to an increased overall size and weight of the rear-wheel steering apparatus 400. The rear-wheel steering apparatus 400 of the increased overall size and weight would require a large-size and high-power electric motor 411 and high-power drive circuit operating with great electric current, thereby unavoidably resulting in increased manufacturing costs of the apparatus.

Inconveniences due to the above-mentioned interlocking jam in threaded engagement between the male and female thread portions would also be encountered in other types of rear-wheel steering apparatus than the above-discussed type as long as they are provided with sliding members movable leftward and rightward via a screw shaft mechanism.

SUMMARY OF THE INVENTION

In view of the foregoing problems, it is an object of the present invention to provide an improved controller unit for a rear-wheel steering apparatus of a four-wheel steering vehicle which, by improved electric and electronic control, can effectively avoid an unwanted interlocking jam between thread portions of sliding members and thread portions of a screw shaft mechanism which would occur when the sliding members are moved by the screw shaft mechanism to left and right outward positions corresponding to a designated steering angle or when the sliding members are returned from the left and right outward positions to their respective central neutral positions, without a need for increasing the overall size and weight of the rear-wheel steering apparatus.

Controller unit of the present invention is designed to control operation of a rear-wheel steering apparatus typically provided in a four-wheel steering automotive vehicle. The rear-wheel steering apparatus, to which the present invention is applied, comprises: a motor for driving rear-wheel steering; a rotational-force transmitting member, such as in the form of an outer rotational-force transmitting cylinder, that is rotatable in accordance with rotation of the motor; a pair of sliding members, such as in the form of left and right sliding cylinders, movable from respective central neutral positions, away from each other, to respective outward positions corresponding to a designated steering angle of rear wheels and movable from the outward positions, toward each other, back to the neutral positions; a threaded engagement section having oppositely-threaded portions and operatively connecting between the rotational-force transmitting member and the sliding members through threaded engagement in such a manner that the sliding members are caused to move away from or toward each other in response to rotation of the rotational-force transmitting member by the motor; a clutch mechanism for operatively connecting either one of the sliding members with a steering rod provided between the rear wheels; and a first stopper for defining the neutral positions of the sliding members and limiting respective inward movement of the sliding members. Here, with the one of the sliding members operatively connected with the steering rod via the clutch mechanism, the rear wheels are turned by a designated steering angle by moving the sliding members outwardly away from each other through rotation of the motor in a first (i.e., forward) direction and are returned to a straight-ahead position by moving the sliding members inwardly toward each other through rotation of the motor in a second (i.e., reverse) direction. In the return-to-neutral stroke of the sliding members, the sliding members are stopped at the respective neutral positions mechanically by the first stopper.

The controller unit according to one aspect of the present invention is based on improved electronic circuitry which comprises a target-steering-angle setting section, an actual-steering-angle measurement device including a steering stroke sensor and an actual-steering-angle measurement section, a steering-angle adjustment section, and a motor-deceleration-amount calculation section. The target-steering-angle setting section sets a target steering angle of the rear wheels to provide an electric signal indicative of the target steering angle. The actual-steering-angle measurement section measures an actual steering angle of the rear wheels to provide a signal indicative of the measured actual steering angle. On the basis of the target steering angle set by the target-steering-angle setting section and the actual steering angle measured by the steering-angle adjustment section, the steering-angle adjustment section generates a motor drive signal to control the rotation of the motor in such a manner that a difference or offset between the target steering angle and the actual steering angle becomes zero, and then the steering-angle adjustment section supplies the motor drive signal to the motor so that, through the rotation of the motor based on the motor drive signal, the sliding members are moved to the outward positions when the rear wheels are to be turned by the designated steering angle or the sliding members are returned to the neutral positions when the rear wheels are to be turned back to the straight-ahead position. On condition that the motor is in a predetermined driving state, the motor-deceleration-amount calculation section is activated to calculate an actual rotating speed of the motor on the basis of the actual steering angle of the rear wheels and compares the calculated actual rotating speed of the motor with a prestored reference rotation speed. The motor-deceleration-amount calculation section operates to calculate a motor-rotation deceleration amount when the compared result indicates that the calculated actual rotating speed is higher than the reference rotation speed. Further, in the rear-wheel steering controller unit, the steering-angle adjustment section includes a subtracter for subtracting the motor-rotation deceleration amount from the motor drive signal.

When the sliding members are to be returned to their respective neutral positions after having moved the rear wheels leftward or rightward, the sliding members are compulsorily stopped mechanically by the first stopper formed on a casing, during which time the controller unit of the present invention compares the calculated actual rotating speed of the motor with the prestored reference rotation speed and adjusts the motor drive signal, in accordance with the compared result, to slow down the motor rotation, in order to prevent an interlocking jam between the sliding members and the rotational-force transmitting member from occurring due to the inertia of the motor.

In the inventive rear-wheel steering controller unit, the above-mentioned predetermined driving state of the motor is a state in which the motor is rotating to return the sliding members to the neutral positions and the sliding members have entered a predetermined decelerating region close to the respective neutral positions. Thus, when the motor is in the predetermined driving state, the rotation of the motor is decelerated, in accordance with the motor-rotation deceleration amount calculated by the motor-deceleration-amount calculation section, immediately before the sliding members are stopped at the neutral positions.

The rear-wheel steering apparatus may include second stoppers for defining respective outermost positions of the sliding members to limit the outward movement of the sliding members. In this case, the predetermined driving state of the motor is a state in which the motor is rotating to move the sliding members to the outward positions and the sliding members have entered a predetermined decelerating region close to the outermost positions. Thus, when the motor is in the predetermined driving state, the rotation of the motor is decelerated, in accordance with the motor-rotation deceleration amount calculated by the motor-deceleration-amount calculation section, immediately before the sliding members are stopped at the outermost positions.

In a preferred implementation of the present invention, the motor-deceleration-amount calculation section includes an actual steering angle differentiator for calculating the actual rotating speed of the motor, and a motor rotation speed table or map for selectively providing a value of the reference rotation speed corresponding to the actual steering angle of the rear wheels measured by the actual-steering-angle measurement section.

According to a second aspect of the present invention, the rear-wheel steering controller unit is characterized by comprising, in addition to the above-mentioned target-steering-angle setting section, actual-steering-angle measurement device, and steering-angle adjustment section, a motor drive limiting section for, on condition that the motor is in a predetermined driving state and the actual steering angle of the rear wheels has entered a predetermined decelerating region, being activated to generate a motor drive limiting signal for limiting the rotation of the motor. In this case, the steering-angle adjustment section adjusts the motor drive signal in accordance with the motor drive limiting signal to thereby decelerate or slow down the rotation of the motor.

In a preferred implementation of the present invention, the motor drive limiting signal is given to a motor drive control section provided in the steering-angle adjustment section for generating a PWM-controlled signal, and wherein generation of the PWM-controlled signal by the motor drive control section is stopped in accordance with the motor drive limiting signal.

Preferably, the motor drive limiting signal is given to a motor-driving bridge circuit provided in the steering-angle adjustment section for generating the motor drive signal. The electrical connecting state within the motor-driving bridge circuit may be varied, in accordance with the motor drive limiting signal, to thereby form a short-circuiting circuit for the motor such that the rotation of the motor is stopped compulsorily through self-power-generating operation of the motor.

Preferably, respective on/off states of four switch elements constituting the motor-driving bridge circuit are controlled in accordance with the motor drive limiting signal, to thereby form the short-circuiting circuit for the motor.

The motor-driving bridge circuit may include a relay section to permit formation of the short-circuiting circuit, and the short-circuiting circuit is provided by controlling the relay section in accordance with the motor drive limiting signal.

Preferably, the above-mentioned predetermined driving state of the motor is a state where the motor is rotating to return the sliding members to the neutral positions and the sliding members have entered a predetermined decelerating region close to the neutral positions, and wherein when the motor is in the predetermined driving state, the motor drive limiting section limits the rotation of the motor immediately before the sliding members are stopped at the neutral positions.

The rear-wheel steering apparatus may further include second stoppers for defining respective outermost positions of the sliding members to limit outward movement of the sliding members, and the predetermined driving state of the motor is a state where the motor is rotating to move the sliding members to the outward positions and the sliding members have entered a predetermined decelerating region close to the outermost positions. Thus, when the motor is in the predetermined driving state, the motor drive limiting section limits the rotation of the motor immediately before the sliding members are stopped at the outermost positions.

BRIEF DESCRIPTION OF THE DRAWINGS

For better understanding of the object and other features of the present invention, its preferred embodiments will be described in greater detail hereinbelow, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
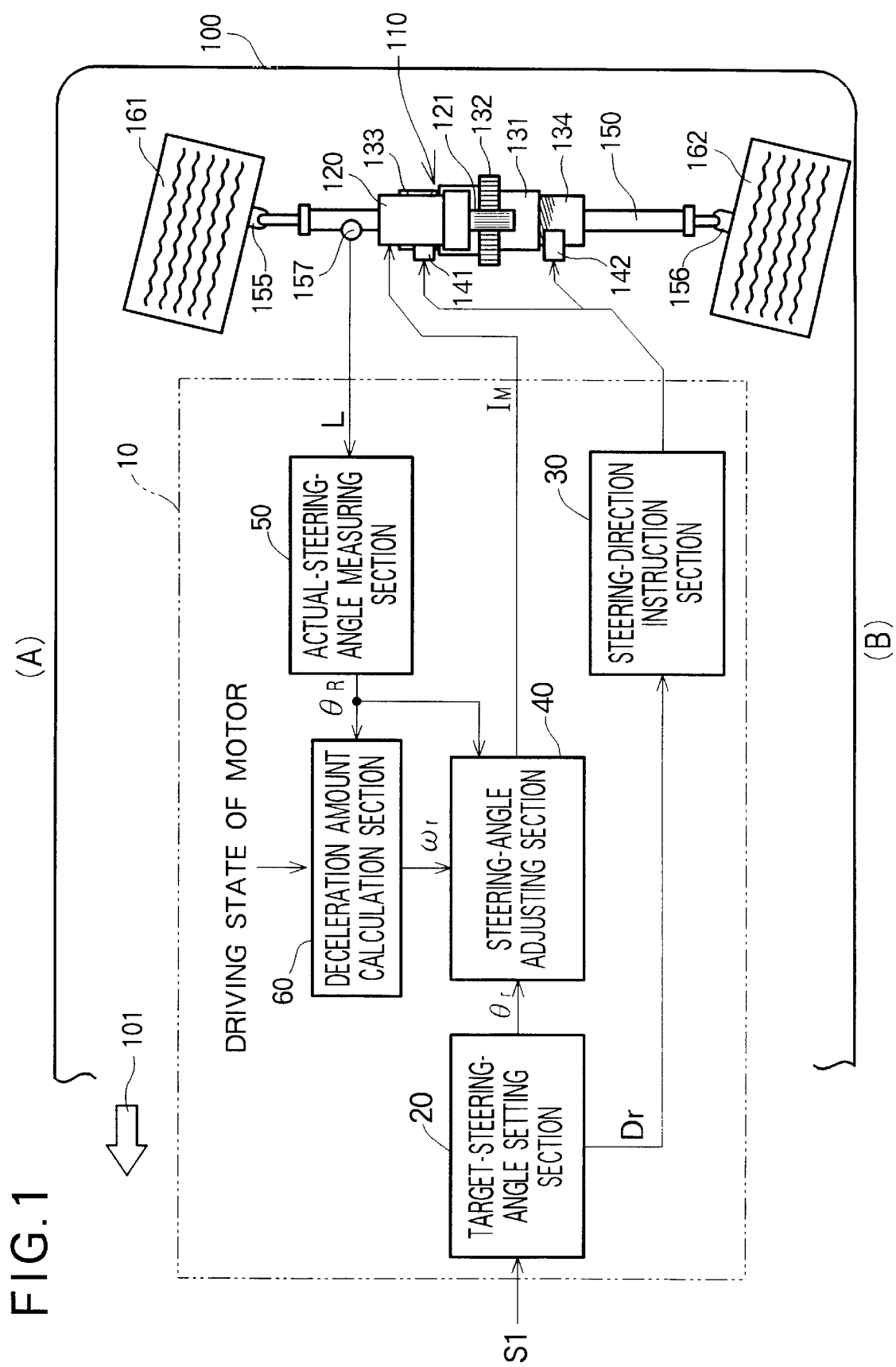
FIG. 1 is a block diagram showing a controller unit in accordance with a first preferred embodiment of the present invention and a rear-wheel steering apparatus controlled by the controller unit.

First embodiment of the present invention will be described below with reference to FIG. 1. FIG. 1 shows a four-wheel steering vehicle 100 to which is applied the present invention and which includes a pair of left and right rear wheels 161 and 162, a rear-wheel steering apparatus 110 provided between the rear wheels 161 and 162, and a controller unit 10 for controlling operation of the rear-wheel steering apparatus 110. The rear-wheel steering apparatus 110 functions to steer the left and right rear wheels 161 and 162 in association with steering of front wheels (not shown) of the vehicle 100. Basic construction and operational principles of the rear-wheel steering apparatus 110 are substantially the same as the rear-wheel steering apparatus 400 disclosed in Japanese Patent Laid-open Publication No. 2000-79881 (corresponding to Japanese Patent Application No. HEI-11-169609). However, the rear-wheel steering apparatus 110 employing the instant embodiment of the invention differs from the prior art rear-wheel steering apparatus 400 in the following details. Similarly to the prior art rear-wheel steering apparatus 400, the rear-wheel steering apparatus 110 employing the instant embodiment has the feature that the steering rod is positioned at its neutral position using a mechanical stopper when returning after having moved leftward or rightward for rear-wheel steering, i.e., in a return-to-neutral stroke. Because the rear-wheel steering apparatus 110 is constructed in generally the same manner as the prior art rear-wheel steering apparatus 400, it would present the same inconvenience in positioning the rear-wheel steering rod at the neutral position after the leftward or rightward steering travel; that is, in the return-to-neutral stroke, there would occur an interlocking jam between thread portions of sliding members and thread portions of a drive mechanism threadedly engaging the sliding members unless no special preventive measures are taken. Thus, the controller unit 10 in accordance with this embodiment has, in addition to the ordinary function of controlling the steering operation of the rear wheels by the rear-wheel steering apparatus 110, an extra control function to avoid the interlocking jam in threaded engagement between the thread portions of the slider members and drive mechanism. The control function to avoid the interlocking jam through electric or electronic control processing constitutes an important aspect of the present invention. Namely, the rear-wheel steering controller unit 10 according to the instant embodiment is designed to prevent, through the later-described electronic control processing, the interlocking jam in threaded engagement between the thread portions of the sliding members and drive mechanism from occurring when the rear-wheel steering rod is returned to the neutral position after its leftward or rightward steering travel, to thereby guarantee smooth rear-wheel steering operation. Note that the leftward direction in FIG. 1 corresponds to the forward direction of the vehicle 100 and thus arrow 101 represents a direction in which the vehicle 100 travels straight ahead. Further, in the illustrated example of FIG. 1, (A) represents the left side of the vehicle 100 while (B) represents the right side.

First, principal mechanical components of the rear-wheel steering apparatus will be described, with reference to FIGS. 2–6 as well as FIG. 1. Similarly to the prior art rear-wheel steering apparatus 400, the rear-wheel steering apparatus 110 employing the instant embodiment has the feature that the rear-wheel steering rod is positioned at its neutral position using the mechanical stopper when returning after having moved leftward or rightward for rear-wheel steering. The rear-wheel steering apparatus 110 includes a linear drive mechanism 130 (FIG. 2) for converting a rotational drive force of an electric motor (e.g., D.C. motor) 120 into a linear steering force to be applied to the left and right rear wheels 161 and 162, clutch mechanisms 140L and 140R (FIG. 2), and a rear-wheel steering rod 150 movable leftward and rightward for the rear-wheel steering purpose.

The following paragraphs describe the linear drive mechanism 130, left and right clutch mechanisms 140L and 140R, rear-wheel steering rod 150 and other mechanisms associated with the operation of the rear-wheel steering rod 150, with reference to FIGS. 2–6. The left and right clutch mechanisms 140L and 140R, which are horizontally symmetrical to each other, operatively connect or disconnect the rear-wheel steering rod 150 to or from the motor 120. The left and right clutch mechanisms 140L and 140R are constructed using a concentric-triple-cylinder structure and a screw-type drive mechanism for moving the rear-wheel steering rod 150 in an axial outward or inward direction, as will be detailed below.

Figure 2:
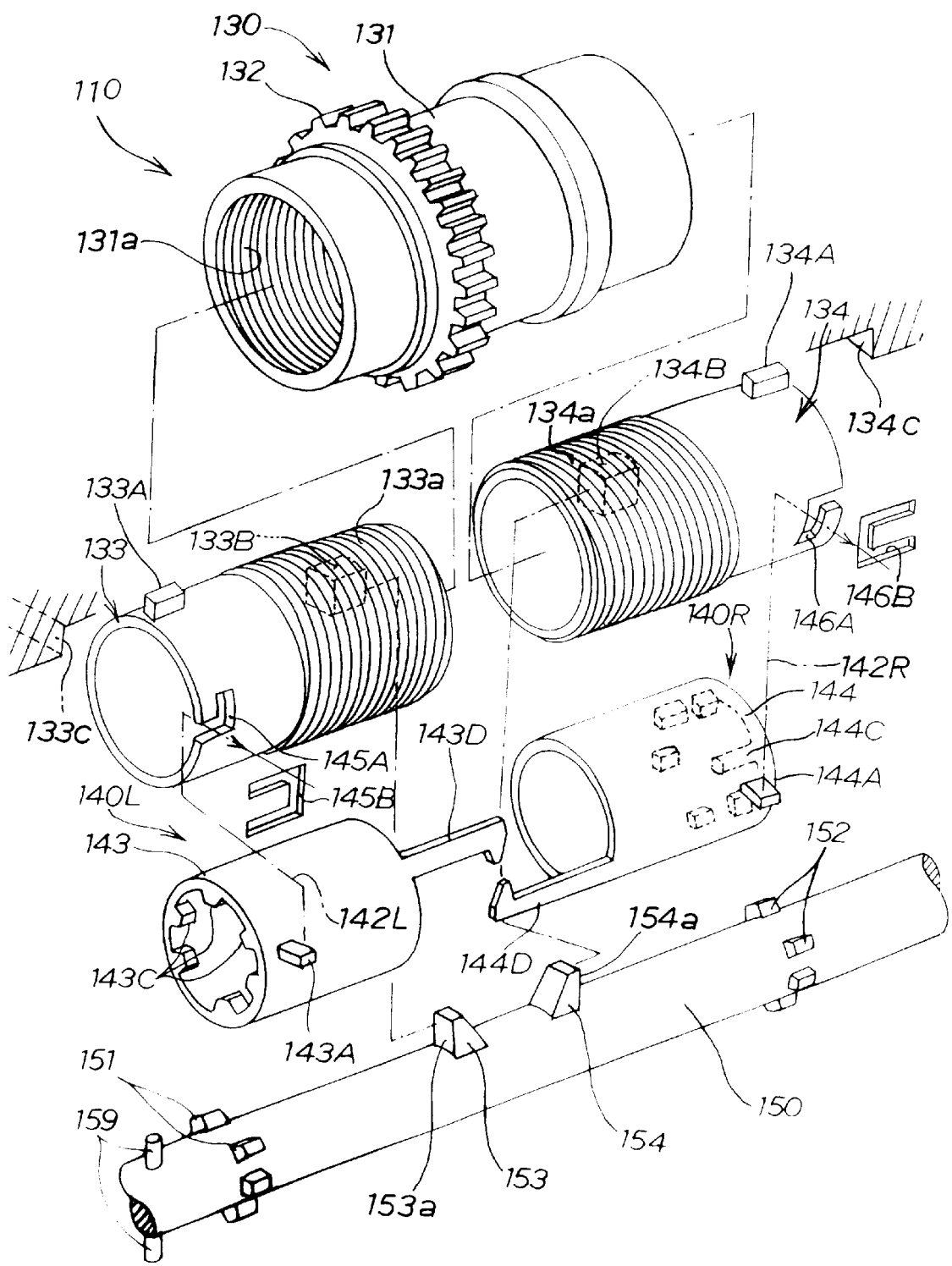
FIG. 2 is an exploded perspective view showing principal mechanical components of the rear-wheel steering apparatus of FIG. 1.
Figure 4:
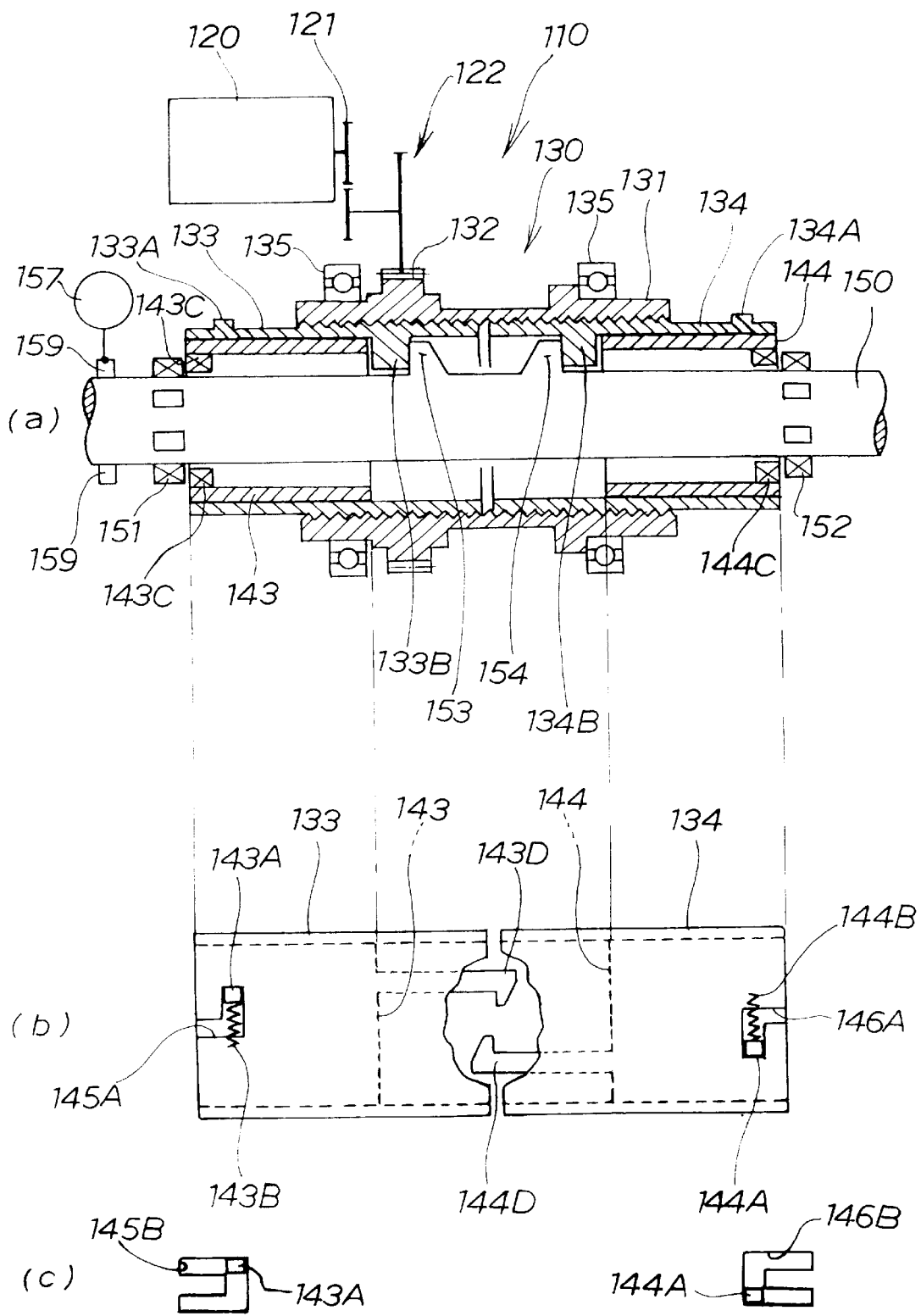
FIG. 4 is a sectional view explanatory of exemplary relationship between the principal mechanical components as fully assembled and between some of the mechanical components and guide grooves formed in a casing.

FIG. 2 is an exploded view showing the linear drive mechanism 130, left and right clutch mechanisms 140L and 140R and rear-wheel steering rod 150. Left and right sliding cylinders 133 and 134 are screwed into a single outer rotational-force-transmitting cylinder 131 through left and right openings of the rotational-force-transmitting cylinder 131. Then, two left and right inner clutch cylinders 143 and 144 are inserted into the left and right sliding cylinders 133 and 134, respectively, via respective axial outer openings of the sliding cylinders 133 and 134. Further, the rear-wheel steering rod 150 is threaded through the two left and right inner clutch cylinders 143 and 144. In FIG. 4, the rear-wheel steering apparatus 110 having been fully assembled is shown in vertical section, from which it should be clear that the outer rotational-force-transmitting cylinder 131, sliding cylinders 133 and 134 and inner clutch cylinders 143 and 144 together constitute the concentric-triple-cylinder structure.

The outer rotational-force-transmitting cylinder 131, which is located outermost of the concentric-triple-cylinder structure, constitutes the above-mentioned linear drive mechanism 130. The outer rotational-force-transmitting cylinder 131 has an externally-toothed gear 132 provided around its outer periphery and a female (or internal) thread 131a formed along its inner surface. The externally-toothed gear 132 meshes with a driving gear 121 secured to an output shaft of the motor 120. Speed reduction mechanism 122 may be provided between the driving gear 121 and the externally-toothed gear 132, as shown in FIG. 4.

The female thread 131a formed along the inner surface of the outer rotational-force-transmitting cylinder 131 is, in effect, cut in opposite directions between the left and right haves of the cylinder 131. In the outer rotational-force-transmitting cylinder 131, there are disposed the left and right intermediate sliding cylinders 133 and 134 in concentric relation to the outer rotational-force-transmitting cylinder 131. As best seen in FIG. 2, the intermediate sliding cylinders 133 and 134 have male or external threads 133a and 134a formed on their respective outer peripheral surfaces. The male threads 133a and 134a are cut in opposite directions so as to mesh with corresponding thread portions of the female thread 131a in the inner surface of the outer rotational-force-transmitting cylinder 131. Namely, when the sliding cylinders 133 and 134 are inserted into the outer rotational-force-transmitting cylinder 131, the male threads 133a and 134a of the sliding cylinders 133 and 134 are brought into mesh with the corresponding thread portions of the female thread 131a of the outer rotational-force-transmitting cylinder 131. Further, each of the intermediate sliding cylinders 133 and 134 has a sliding-guide projection 133A, 134A formed on its outer surface near the axial outward end thereof. The sliding-guide projections 133A and 134A engage with portions of a not-shown casing so as to prevent the left and right intermediate sliding cylinders 133 and 134 from rotating relative to the not-shown casing.

As the motor 120 rotates in a particular (e.g., forward) direction, the outer rotational-force-transmitting cylinder 131 is caused to rotate through the meshing engagement between the driving gear 121 and the externally-toothed gear 132 of the cylinder 131. The rotation of the outer rotational-force-transmitting cylinder 131, in turn, causes the left and right intermediate sliding cylinders 133 and 134 to slide outwardly away from each other, along the axis of the rear-wheel steering rod 150, through the meshing engagement between the left-handed and right-handed thread portions of the female thread 131a of the outer rotational-force-transmitting cylinder 131 and the opposite-cut male threads 133a and 134a of the sliding cylinders 133 and 134. Then, as the motor 120 rotates in a direction opposite to the particular direction (i.e., reverse direction), the outer rotational-force-transmitting cylinder 131 is caused to rotate in the reverse direction so that the left and right intermediate sliding cylinders 133 and 134 slide inwardly toward each other along the axis of the rear-wheel steering rod 150. The inward sliding movement allows the left and right intermediate sliding cylinders 133 and 134 to be returned to their respective neutral positions as defined by the mechanical stopper. As noted earlier, the sliding cylinders 133 and 134 can be reliably prevented, by the provision of the respective projections 133A and 134A, from rotating during the sliding movement.

In the above-mentioned outward movement of the sliding cylinders 133 and 134, the respective sliding-guide projections 133A and 134A are engaged by left and right mechanical end stoppers provided on the not-shown casing, so that the sliding movement of the sliding cylinders 133 and 134 is limited to between the mechanical end stoppers. Also, the interior of the casing is so constructed to even more reliably prevent the sliding cylinders 133 and 134 from moving beyond predetermined outermost points.

Figure 3:
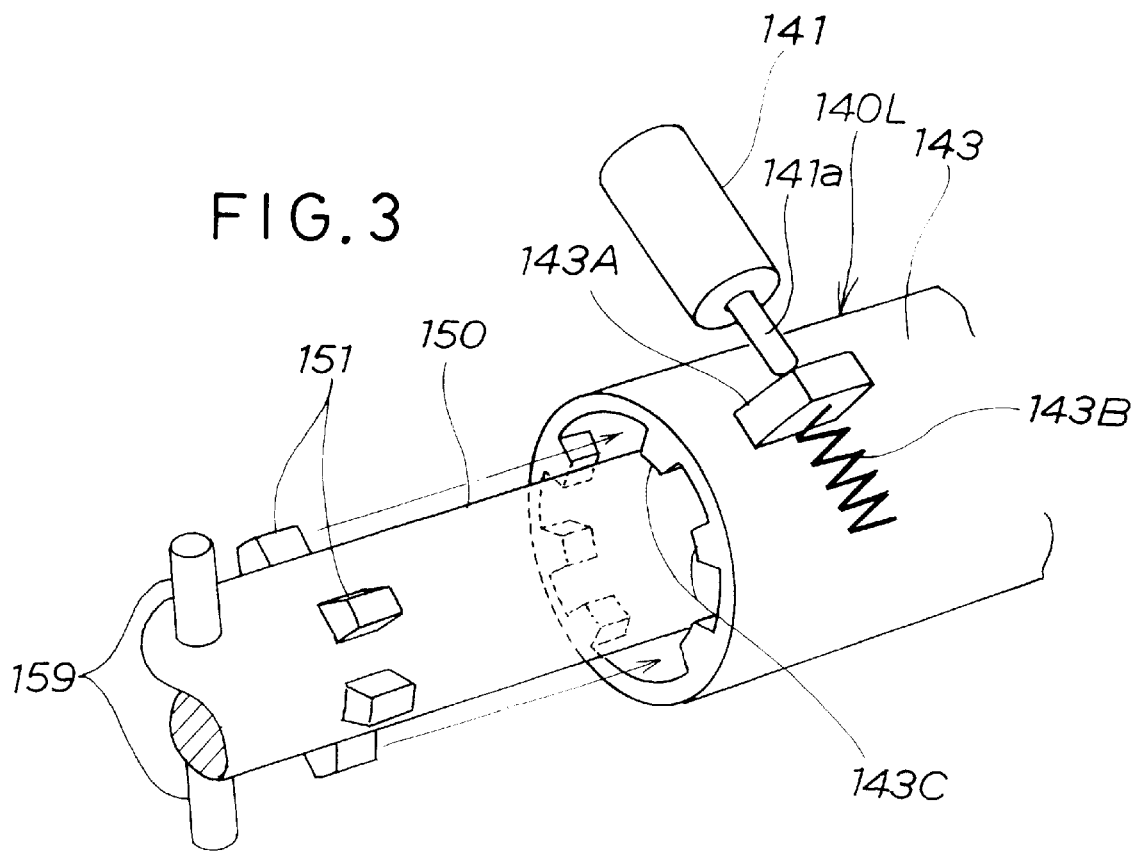
FIG. 3 is a schematic exploded perspective view showing exemplary relationship between a steering rod and inner clutch cylinders in clutch mechanisms.

In the above-mentioned left and right sliding cylinders 133 and 134, there are incorporated the above-mentioned left and right clutch mechanisms 140L and 140R, respectively. FIG. 3 is a schematic perspective view showing the principal components of the left clutch mechanism 140L of FIG. 2 in a fully assembled state.

Construction of the left clutch mechanism 140L will now be described with reference to FIGS. 2 and 3. Note that the right clutch mechanism 140R is constructed similarly to the left clutch mechanism 140L except that it is disposed in point symmetry to the left clutch mechanism 140L.

As illustrated in FIG. 3, the left clutch mechanism 140L includes a left electromagnetic actuator 141 containing a solenoid, and an inner clutch cylinder 143 disposed within the sliding cylinder 133 in concentric relation thereto and rotatable within the sliding cylinder 133 in sliding contact with the inner surface of the sliding cylinder 133. The inner clutch cylinder 143 is inserted in the sliding cylinder 133 through the axial outer opening of the cylinder 133. As denoted by dot-and-dash line 142L of FIG. 2, the projection 143A formed on the outer surface of the inner clutch cylinder 143 near the axial outer end of the cylinder 143 is fitted through an L-shaped guide recess 145A formed at the axial outer end of the sliding cylinder 133 and then engaged in a generally U-shaped guide groove 145B formed in the not-shown casing. Thus, the projection 143A functions as a clutch lever. As shown in FIG. 3, the left electromagnetic actuator 141 causes a movable pin 141a to extend or project, in response to energization of the solenoid, to abut against the projection 143A of the inner clutch cylinder 143 supported by a spring 143B. The inner clutch cylinder 143 is resiliently urged by the spring 143B in a counterclockwise direction as viewed from it axial inner end.

Once the solenoid of the electromagnetic actuator 141 is energized, the pin 141a depress the projection 143A of the inner clutch cylinder 143 against the bias of a spring 143B. At that time, the projection 143A moves along respective circumferential portions of the guide grooves 145A and 145B. The depression of the projection 143A by the pin 141a of the left electromagnetic actuator 141 causes the inner clutch cylinder 143 to rotate a predetermined angle within the sliding cylinder 133.

Further, the inner clutch cylinder 143 has a plurality of clutching teeth 143C, functioning as an internally-teethed gear, formed along the inner peripheral surface at the axial outer end thereof. On the other hand, the rear-wheel steering rod 150, threaded through the inner clutch cylinder 143, has a plurality of engaging teeth 151, equal in number to the clutching teeth 143C of the clutch cylinder 143 and functioning as an externally-teethed gear, formed along the outer peripheral surface thereof. The clutching teeth 143C and the engaging teeth 151 are formed at the same pitch. The engaging teeth 151 of the steering rod 151 are "spline-coupled" with the clutching teeth 143C from outside the axial outer end of the inner clutch cylinder 143 so that they can be properly positioned between the clutching teeth 143C.

As further shown in FIG. 2, the inner clutch cylinder 143 has a locking claw 143D formed on its axial inner end to extend inwardly or toward an inner clutch cylinder 144 of the other clutch mechanism 140R.

Whereas the preceding paragraphs have described the left clutch mechanism 140L alone, it should be appreciated that the right clutch mechanism 140R have similar components. Namely, the right clutch mechanism 140R includes the inner clutch cylinder 144 corresponding to the right sliding cylinder 134. The right sliding cylinder 134 has an L-shaped guide recess 146A formed at the axial outer end thereof, and a generally U-shaped guide groove 146B is formed in a corresponding portion of the not-shown casing. Note that the L-shaped guide recess 146A of the right sliding cylinder 134 is shaped differently from the counterpart 145A of the left sliding cylinder 133; that is, while the L-shaped guide recess 145A has its circumferential groove portion extending upward from an axial groove portion, the L-shaped guide recess 146A has its circumferential groove portion extending downward from an axial groove portion, as shown in FIG. 2. The inner clutch cylinder 144 of the right clutch mechanism 140R has the projection 144A formed on the outer surface thereof near the axial outer end of the cylinder 144 and a plurality of clutching teeth 144C, functioning as an internally-teethed gear, formed along the inner peripheral surface at the axial outer end thereof. The inner clutch cylinder 144 also has a locking claw 144D formed on its axial inner end to extend inwardly or toward the inner clutch cylinder 134 of the left clutch mechanism 140L. Further, the rear-wheel steering rod 150, threaded through the inner clutch cylinder 144, has a plurality of engaging teeth 152, equal in number to the clutching teeth 144C, formed along the outer peripheral surface thereof. In addition, the right clutch mechanism 140R includes a right electromagnetic actuator 142 (FIG. 1) for acting on the projection 144A of the right inner clutch cylinder 144.

The above-described left and right clutch mechanisms 140L and 140R can operatively connect or disconnect the rear-wheel steering rod 150 to or from the motor 120 as desired through the engagement or disengagement between the clutching teeth 143C, 144C of the clutch mechanisms 140L, 140R and the engaging teeth 151, 152 of the steering rod 150. The locking claws 143D and 144D provided at the respective inner ends of the inner clutch cylinders 143 and 144 engage with each other to prevent leftward/rightward displacement of the inner clutch cylinders 143 and 144 when the cylinders 143 and 144 rotate simultaneously.

As further shown in FIGS. 2 and 3, the rear-wheel steering rod 150 has guide pins 159 formed, for example, at its left end portion, and guide channel portions are formed in the not-shown casing in corresponding relation to the guide pins 159 for receiving the pins 159. The steering rod 150 is caused to move axially with the guide pins 159 sliding in and along the guide channel portions, so that the steering rod 150 can move axially leftward or rightward without accidentally rotating about its axis. Steering stroke sensor 157 (FIG. 1) is provided on or near the steering rod 150 for detecting a distance of the leftward or rightward travel of the steering rod 150. In addition, the steering rod 150 has left and right center protrusions 153 and 154 that correspond in position to the left and right sliding cylinders 133 and 134 in the fully assembled state. Further, inward protrusions 133B and 134B are formed on the respective inner surfaces of the left and right sliding cylinders 133 and 134, in corresponding relation to the center protrusions 153 and 154 of the steering rod 150, in such a way that the protrusions 133B and 134B contact the outer end surfaces 153a and 154a of the corresponding center protrusions 153 and 154. Furthermore, the rear-wheel steering rod 150 is coupled at its opposite ends to the left and right rear wheels 161 and 162 of the vehicle 100 by way of left and right link mechanisms 155 and 156 (FIG. 1) including knuckle arms (also called steering arms), and the rear wheels 161 and 162 are pivotable about not-shown kingpins for the rear-wheel steering purpose.

Figure 5:
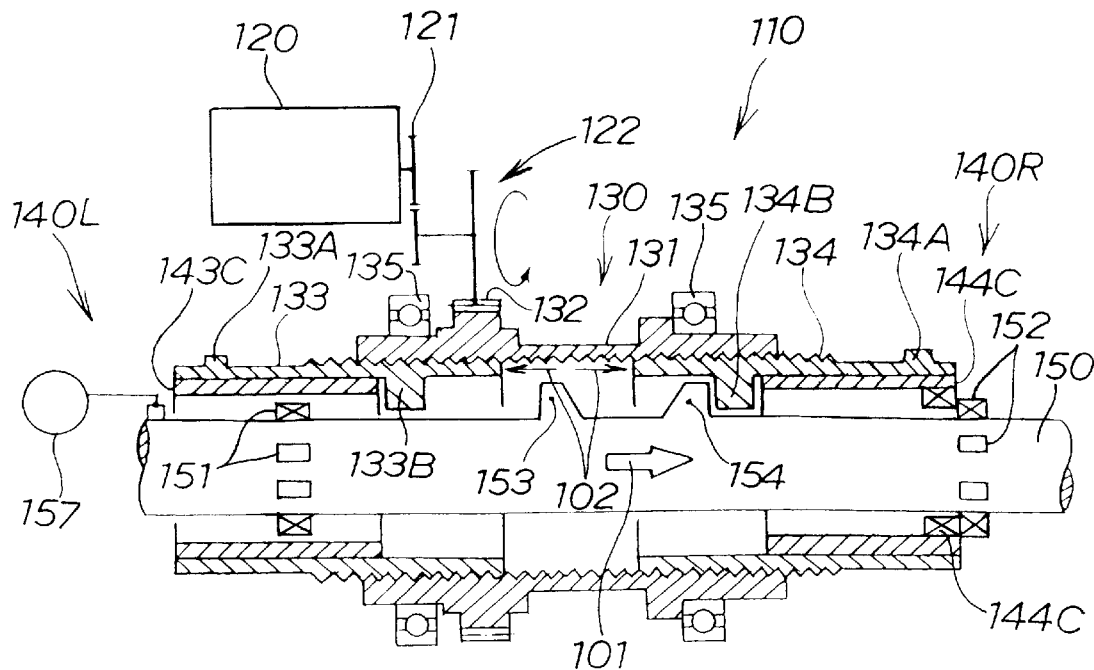
FIG. 5 is a vertical sectional view explanatory of exemplary operation of some of the mechanical components for moving the steering rod axially from its neutral position toward an outward position.
Figure 6:
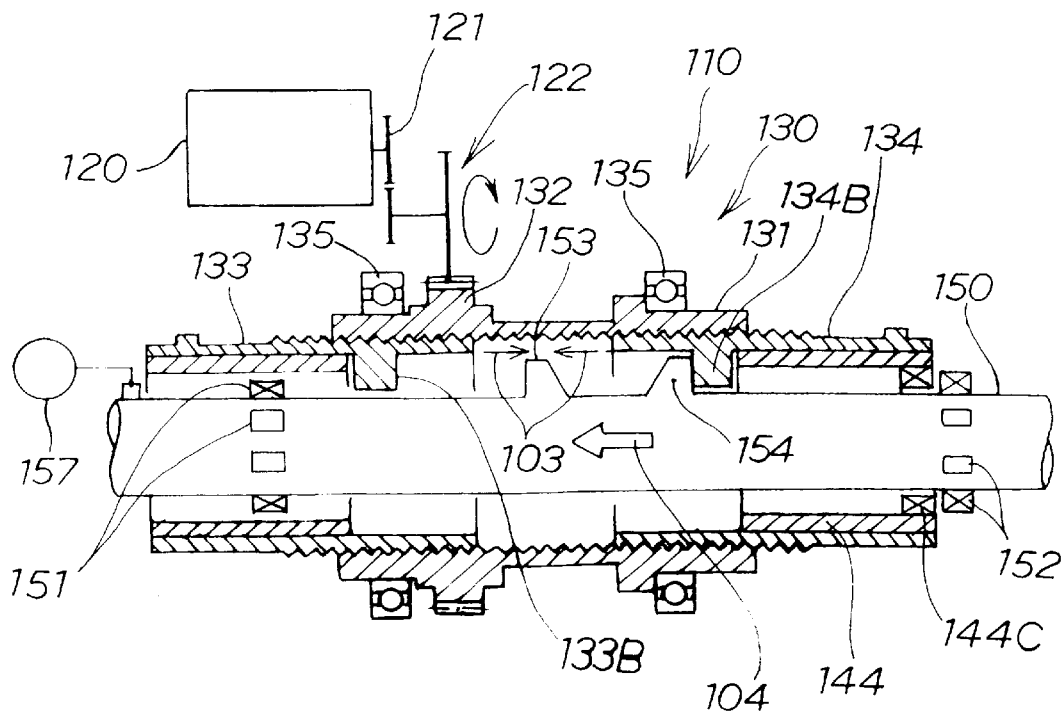
FIG. 6 is a vertical sectional view explanatory of exemplary operation of some of the mechanical components for moving the steering rod axially from an outward position back to the neutral position.

Now, a description will be made about the operation of the rear-wheel steering apparatus 110, primarily with reference to FIGS. 4 to 6 that are vertical sectional views of the steering apparatus 110 in the fully assembled state. In FIGS. 4 to 6, the rear-wheel steering apparatus 110 is shown as including the speed reduction mechanism 122 between the driving gear 121 secured to the output shaft of the motor 120 and the externally-toothed gear 132 of the outer rotational-force-transmitting cylinder 131. The outer rotational-force-transmitting cylinder 131 is rotatably supported via left and right bearings 135.

Let it be assumed here that the left and right sliding cylinders 133 and 134 are initially at their respective neutral positions close to each other in the axial central section of the rear-wheel steering apparatus 110 and thus the left and right rear wheels 161 and 162 are directed straight ahead with a zero steering angle. FIG. 4 shows such an initial state; more particularly, part (a) of FIG. 4 is a vertical sectional view showing the principal components of the rear-wheel steering apparatus 110, part (b) shows the relationship between the left and right sliding cylinders 133, 134 and the inner clutch cylinders 143, 144, and part (c) shows the positions of the projections 143A and 144A of the inner clutch cylinders 143 and 144 in the corresponding guide groove 145B formed in the not-shown casing.

As illustrated in FIG. 4, when the rear-wheel steering rod 150 is at its central, neutral position, the left and right sliding cylinders 133 and 134 are located, close to each other, centrally within the outer rotational-force-transmitting cylinder 131. At that time, the center protrusions 153 and 154 of the steering rod 150 are kept in contact with the inward protrusions 133B and 134B formed on the inner surfaces of the sliding cylinders 133 and 134, so that the steering rod 150 is maintained at the central neutral position and the sliding cylinders 133 and 134 is prevented from being axially displaced relative to the steering rod 150. When the left and right sliding cylinders 133 and 134 are at their respective neutral positions, the projection 143A of the inner clutch cylinder 143 is maintained at the upper end of the circumferential groove portion of the L-shaped guide groove 145A of the left sliding cylinder 133 by being resiliently urged upward by the spring 143B, while the projection 144A of the inner clutch cylinder 144 is maintained at the lower end of the circumferential groove portion of the L-shaped guide groove 146A of the right sliding cylinder 134 by being resiliently urged downward by the spring 144B. Further, because the inner clutch cylinders 143 and 144 are maintained at their respective circumferential positions determined by the circumferential positions of the projections 143A and 144A while the left and right sliding cylinders 133 and 134 are at their respective neutral positions, the clutching teeth 143C and 144C of the inner clutch cylinders 143 and 144 are kept in contact with the engaging teeth 151 and 152 of the steering rod 150, so that the steering rod 150 is retained at its neutral position.

Here, it is also assumed that the left electromagnetic actuator 141 is activated or turned on to move the steering rod 150 rightward from the neutral position as denoted by arrow 101 in FIG. 5. Upon turning on of the left electromagnetic actuator 141, the projection 143A is depressed against the bias of the spring 143A to cause the corresponding inner clutch cylinders 143 to rotate, so that the engagement between the clutching teeth 143C and the engaging teeth 151 is canceled and thus the rear-wheel steering rod 150 is allowed to move rightward from the neutral position.

Then, as the electric motor 120 is caused to rotate in the forward direction with the left electromagnetic actuator 141 kept activated, the outer rotational-force-transmitting cylinder 131 rotates and the left and right sliding cylinders 133 and 134 are caused to move outward away from each other, as arrowed at 102 in FIG. 5, through the meshing engagement between the female thread of the outer rotational-force-transmitting cylinder 131 and the male threads of the sliding cylinders 133 and 134. At that time, as noted above, the engaging teeth 151 of the steering rod 150 each lie between the clutching teeth 143C of the left sliding cylinder 133 and thus does not restrict the rightward movement of the steering rod 150. The clutching teeth 144C of the right sliding cylinder 143, on the other hand, are brought into contact with the right engaging teeth 152 of the steering rod 150, so that the steering rod 150 is pushed and displaced rightward as the right sliding cylinder 143 moves rightward. In accordance with the rightward movement of the steering rod 150, the left and right rear wheels 161 and 162 are turned right relative to the straight-ahead traveling direction of the vehicle 100. The rightward movement of the steering rod 150 is ceased at a predetermined outward position corresponding to a designated target steering angle such that the rear wheels 161 and 162 assume the designated target steering angle. When desired, the steering rod 150 can be stopped accurately at the right or left outmost position by the movement of the steering rod 150 being restricted using, as mechanical stoppers, the guide grooves 145B and 146B formed in the casing or inner wall surface portions 133C and 134C of the casing.

Then, as the electric motor 120 is caused to rotate in the reverse direction in the steering state of FIG. 5, the outer rotational-force-transmitting cylinder 131 rotates in the reverse direction and the left and right sliding cylinders 133 and 134 are caused to move inward toward each other, as arrowed at 103 in FIG. 6. At that time, the inward protrusion 133B formed on the inner surface of the right sliding cylinder 134 presses inwardly the center protrusion 154 of the steering rod 150 in such a manner that steering rod 150 is displaced leftward, as arrowed at 104, to be returned to the neutral position, in accordance with which the rear wheels 161 and 162 are turned back to the straight-ahead position. Also, the left and right sliding cylinders 133 and 134 are moved back to and stopped at their respective neutral positions with the center protrusions 153 and 154 engaging the sliding cylinders 133 and 134 to prevent further movement of the cylinders 133 and 134. Once the left and right sliding cylinders 133 and 134 have returned to the respective neutral positions in the above-described manner, the electromagnetic actuator 141 is deactivated or turned off to cause the rear-wheel steering apparatus to return to the state of FIG. 4, and thus the steering rod 150 returns to the central neutral position.

Note that the guide grooves 145A, 145B, 146A and 146B are formed so as not to prevent the rightward movement of the steering rod 150 shown in FIG. 4.

When the steering rod 150 is to be displaced leftward from the neutral position of FIG. 4 to thereby turn the rear wheels 161 and 162 and then the steering rod 150 is to be returned to the neutral position, the right electromagnetic actuator 142 is turned on and the motor 120 is caused to rotate in a predetermined direction. This way, the rear-wheel steering apparatus can operate in a manner substantially similar to the above-described right steering operation.

In the above-described embodiment, the sliding cylinders 133 and 134 are arranged to stop at the respective neutral positions by means of the mechanical stoppers in their return travel to the neutral positions after the steering apparatus have turned the rear wheels 161 and 162. Thus, unless particular preventive measures are taken, there would be encountered the interlocking jam problem as discussed earlier in relation to the prior art rear-wheel steering apparatus. Namely, in the instant embodiment, the center protrusions 153 and 154 of the steering rod 150 engage with the inward protrusions 133B and 134B formed on the inner surfaces of the sliding cylinders 133 and 134 to allow the cylinders 133 and 134 to stop at the neutral positions. But, unless the rotation of the motor 120 is decelerated properly, the inertial force by the rotation of the motor 120 would create an undesired interlocking jam in threaded engagement between the female thread of the outer rotational-force-transmitting cylinder 131 and the male threads of the sliding cylinders 133 and 134. It is therefore an important feature of the present invention that such an interlocking jam in threaded engagement between the female thread of the outer rotational-force-transmitting cylinder 131 and the male threads of the sliding cylinders 133 and 134 is reliably avoided by the rear-wheel steering controller unit 10 properly controlling the rotating speed of the motor 120.

Specifically, when the steering rod 150 is displaced leftward or rightward from the neutral position to turn the rear wheels 161 and 162, the rear-wheel steering controller unit 10 of the present invention controls the ON/OFF states of the left and right electromagnetic actuators 141 and 142 and rotation of the motor 120 on the basis of steering states of the front wheels while detecting a changing travel amount or distance of the steering rod 150 by means of the steering stroke sensor 157 (FIG. 1). More specifically, the rear-wheel steering controller unit 10 performs control to turn the rear wheels 161 and 162 rightward or leftward or back to the straight-ahead direction (neutral position) in association with the steering of the front wheels, to thereby implement the rear-wheel steering that helps to achieve enhanced traveling stability and performance of the vehicle 100. In particular, the rear-wheel steering controller unit 10 of the present invention performs control to appropriately reduce the rotating speed of the motor 120, with particular attention to the inertia of the motor, during the reverse motor rotation to return the rear wheels to the straight-ahead position.

Next, a detailed description will be made about construction and behavior of the rear-wheel steering controller unit 10 in accordance with a preferred embodiment of the present invention, with reference to FIGS. 1 and 7 to 15.

First, exemplary basic construction of the rear-wheel steering controller unit 10 in accordance with the first embodiment of the present invention will be described with primary reference to FIG. 1. As shown, the controller unit 10 includes a target-steering-angle setting section 20, a steering-direction instruction section 30, a steering-angle adjustment section 40, an actual steering-angle measurement section 50 and a motor-deceleration-amount calculation section 60. Instruction signal S1, instructing steering of the rear wheels and representing current steering conditions such as a speed of the vehicle 100 and steering angle of the front wheels, is given to the controller unit 10, where the steering instructing signal S1 is introduced into the target-steering-angle setting section 20. In response to the steering instructing signal S1, the target-steering-angle setting section 20 generates a signal Dr indicative of a steering direction of the rear wheels 161 and 162 and a signal θr indicative of a target steering angle of the rear wheels 161 and 162. The thus-generated steering direction signal Dr is given to the steering-direction instruction section 30, while the target steering angle signal θr is given to the steering-angle adjustment section 40. On the basis of the given steering direction signal Dr, the steering-direction instruction section 30 generates a signal to turn on either one of the left and right electromagnetic actuators 141 and 142 normally kept in the OFF state. The steering-angle adjustment section 40, on the basis of the target steering angle signal θr, generates a motor drive signal $I_M$, in the form of an electric current value, that determines a rotation amount of the motor 120. In relation to the generation of the motor drive signal $I_M$ by the steering-angle adjustment section 40, the target steering angle signal θr, representing a target control amount of the motor 120, is adjusted using a signal L indicative of a travel amount of the steering rod 150 generated by the steering stroke sensor 157. The travel amount signal L is introduced into the actual steering-angle measurement section 50, in response to which the actual steering-angle measurement section 50 calculates an estimated actual steering angle of the rear wheels 161 and 162 and thereby generates an actual steering angle signal $θ_R$. The actual steering angle signal $θ_R$ thus generated by the actual steering-angle measurement section 50 is passed to the motor-deceleration-amount calculation section 60 as well as the steering-angle adjustment section 40. On the basis of the actual steering angle signal $θ_R$, the motor-deceleration-amount calculation section 60 calculates a deceleration amount ωr of the motor rotation on condition that the motor 120 is in a predetermined driving state as will be described and generates a deceleration amount signal ωr. Specifically, the deceleration amount ωr is calculated and the deceleration amount signal ωr is generated only when the motor 120 is rotating in the reverse direction to return the rear wheels 161 and 162 to the straight-ahead position, as will be described later. Because it is only necessary to ascertain whether or not the reverse rotation of the motor 120 has been initiated to return the rear wheels 161 and 162 to the straight-ahead position, a signal indicative of the current state of the motor 120 can be provided, for example, using an output signal from a motor drive control section (like the one denoted at 44 in FIG. 7) provided in the steering-angle adjustment section 40. The deceleration amount signal ωr is given to the steering-angle adjustment section 40, which in turn generates the motor drive signal $I_M$ using the above-mentioned signal θr indicative of the target steering angle representing the target control amount, signal $θ_R$ indicative of the actual steering angle and signal ωr indicative of the deceleration amount.

To calculate the actual steering angle $θ_R$ from the travel amount signal L, the actual steering-angle measurement section 50 in the instant embodiment uses arithmetic operations based on the inverse trigonometric function.

The construction of the rear-wheel steering controller unit 10 will now be described more fully with reference to FIGS. 7–9.

Figure 7:
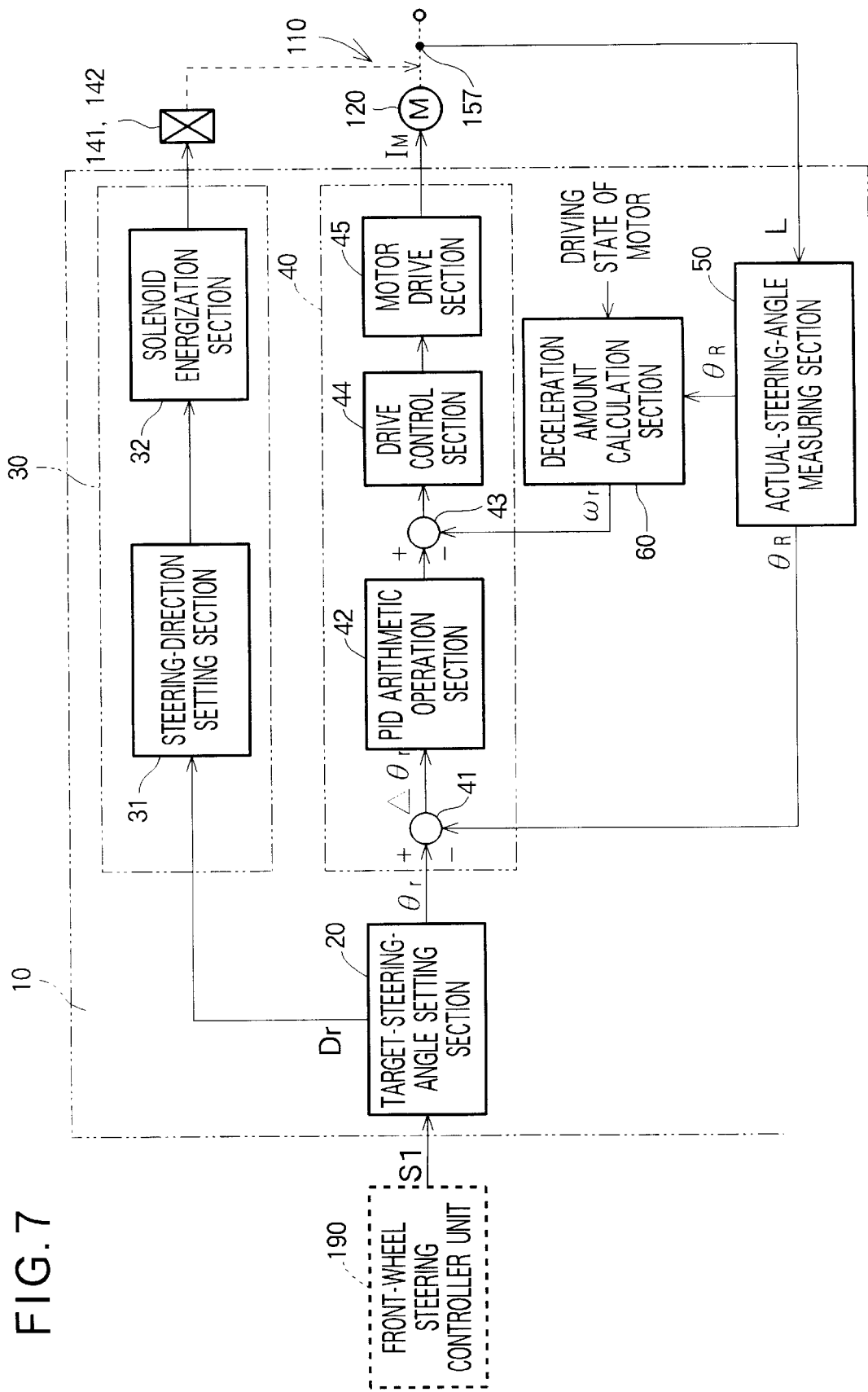
FIG. 7 is a block diagram showing exemplary details of a steering-direction instruction section and steering-angle adjustment section in the controller unit of FIG. 1.

FIG. 7 is a block diagram showing exemplary details of the steering-direction instruction section 30 and steering-angle adjustment section 40 shown in FIG. 1. The steering instruction signal S1 is typically given from a front-wheel steering apparatus 190 and then introduced into the target-steering-angle setting section 20, so that the rear-wheel steering apparatus controlled by the controller unit 10 operates in association with the front-wheel steering apparatus 190. The target-steering-angle setting section 20 includes a target steering angle table and generates the above-mentioned steering direction signal Dr and steering angle signal θr, using this target steering angle table, on the basis of current steering conditions, such as a speed of the vehicle and steering angle of the front wheels, represented by the steering instruction signal S1.

The steering-direction instruction section 30 includes a steering-direction determination section 31 and a solenoid energization section 32. The above-mentioned steering direction signal Dr generated by the target-steering-angle setting section 20 is sent to the steering-direction determination section 31, in response to which the steering-direction determination section 31 designates one of the left and right electromagnetic actuators 141 and 142 that is to be turned on. Output signal from the steering-direction determination section 31 is given to the solenoid energization section 32, which in turn generates a solenoid energization signal to turn on the designated electromagnetic actuator 141 or 142.

The steering-angle adjustment section 40 includes subtracters 41 and 43, a PID arithmetic operation section 42, the above-mentioned motor drive control section 44, and a motor drive section 45. The subtracter 41 subtracts the actual steering angle signal $\theta_R$ from the target steering angle signal $\theta r$ introduced into the steering-angle adjustment section 40, to thereby generate an offset signal $\Delta\theta r$ indicative of the subtracted result or difference ($\theta r-\theta_R$). The difference or offset signal $\Delta\theta r$ is passed to the PID arithmetic operation section 42, which performs PID (Proportional, Integral and Differential) arithmetic operations on the difference signal $\Delta\theta r$. The difference signal $\Delta\theta r$ having been subjected to the PID arithmetic operations is provided as a signal for determining a steering amount of the rear wheels 161 and 162, in accordance with which the rear-wheel steering apparatus 110 will steer the rear wheels 161 and 162. As the actual steering angle signal $\theta_R$ approaches in value the target steering angle signal $\theta r$, the difference or offset signal $\Delta\theta r$ approaches zero.

The other subtracter 43, immediately succeeding the PID arithmetic operation section 42, subtracts the deceleration amount $\omega r$ from the value of the offset signal $\Delta\theta r$ having been subjected to the PID arithmetic operations. In the instant embodiment, the deceleration amount signal $\omega r$ is generated by the motor-deceleration-amount calculation section 60 on condition that the reverse rotation of the motor 120 has been initiated for returning the rear wheels 161 and 162 to the straight-ahead position. The reason why the deceleration amount $\omega r$ is subtracted from the difference signal $\Delta\theta r$ having been subjected to the PID arithmetic operations is as follows. Namely, the difference signal $\Delta\theta r$ having been subjected to the PID arithmetic operations is a signal for determining a steering amount of the rear wheels 161 and 162. In order to return the steering rod 150 to the neutral position and thereby return the rear wheels to the straight-ahead position without causing the above-mentioned interlocking jam problem, it is necessary to stop the reverse motor rotation while appropriately reducing the rotating speed of the motor 120 taking the inertia of the motor 120 into account. Thus, in the instant embodiment, the motor-deceleration-amount calculation section 60 is arranged to calculate the deceleration amount $\omega r$ on the basis of the actual steering angle signal $\theta_R$, and the steering-angle adjustment section 40 is arranged to subtract the deceleration amount $\omega r$ from the difference signal $\Delta\theta r$ having been subjected to the PID arithmetic operations, to thereby limit the level of the motor drive signal $I_M$.

The difference or offset signal ($\Delta\theta r-\omega r$) from the subtracter 43 is passed to the motor drive control section 44. On the basis of the difference signal ($\Delta\theta r-\omega r$), the motor drive control section 44 generates a PWM (Pulse Width Modulation)-controlled signal to be sent to the motor drive section 45, where the PWM-controlled signal is converted into the motor drive signal $I_M$ for actually driving the motor 120 to rotate. Namely, the motor drive signal $I_M$ is generated as the PWM-controlled signal based on the offset signal ($\Delta\theta r-\omega r$). Thus, the rotation of the motor 120 is subjected to duty cycle control based on the PWM principle.

Figure 8:
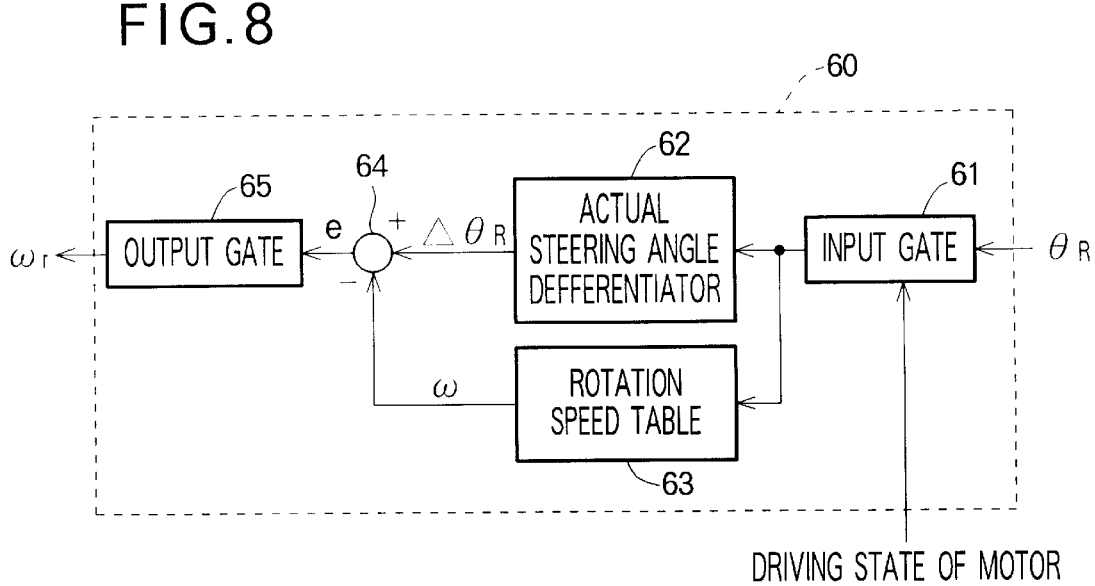
FIG. 8 is a block diagram showing exemplary details of a motor-deceleration-amount calculation section shown in FIG. 7.

FIG. 8 is a block diagram showing exemplary details of the motor-deceleration-amount calculation section 60, which includes an input gate 61, an actual steering angle differentiator 62, a motor rotation speed map or table 63, a subtracter 64 and an output gate 65. The signal $\theta_R$ indicative of the actual steering angle is introduced into the input gate 61 on condition that the motor 120 is in a predetermined driving state (in this case, reversely-rotating state). When the input data 61 is open, the actual steering angle signal $\theta_R$ is passed to the actual steering angle differentiator 62 and motor rotation speed table 63 provided in parallel to each other.

The actual steering angle differentiator 62 performs a differentiation operation on the actual steering angle signal $\theta_R$ to thereby provide a differentiated steering angle signal $\Delta\theta_R$. Because the differentiated steering angle signal $\Delta\theta_R$ is the result of differentiating the actual steering angle, it represents an actual reversely-rotating speed of the motor 120.

Figure 9:
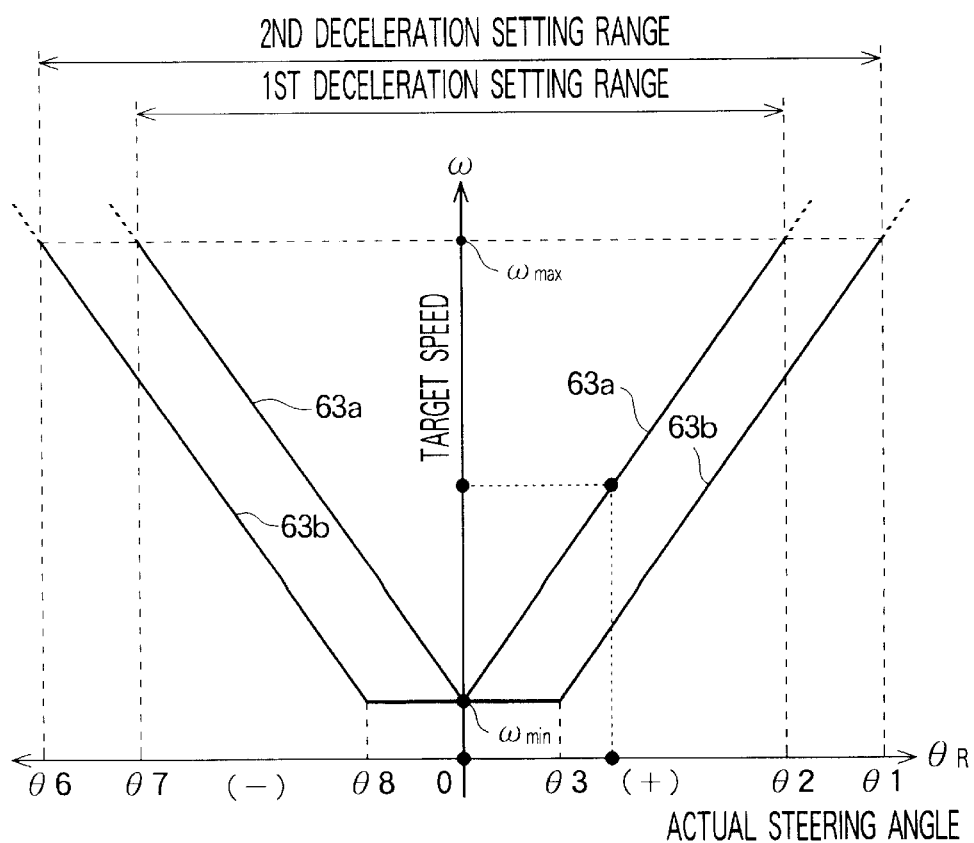
FIG. 9 is a graph showing examples of steering-angle-to-rotation-speed conversion characteristics stored in a motor rotation speed map or table.

From the motor rotation speed table 63, a target motor rotation speed corresponding to the input actual steering angle signal $\theta_R$ is obtained in accordance with steering-angle-to-rotation-speed conversion characteristics as illustratively shown in FIG. 9 and is provided as a target motor rotation speed signal $\omega$. Exemplary details of the motor rotation speed table 63 will be later described with reference to FIG. 9. The subtracter 64 subtracts the target motor rotation speed signal $\omega$ from the differentiated steering angle signal $\Delta\theta_R$ to thereby provide a signal e indicative of the difference or offset. The offset signal e is sent to the output gate 65. The output gate 65, which also has a signal amplifying function, outputs the deceleration amount signal $\omega r$ in amplified form when the difference signal e is of a positive value, but does not output the deceleration amount signal $\omega r$ at all when the difference signal e is of a negative value.

In the motor-deceleration-amount calculation section 60, the actual steering angle signal $\theta_R$ is selectively input via the input gate 61 on condition that the reverse rotation of the motor 120 has been initiated. The motor-deceleration-amount calculation section 60 calculates a variation amount in the actual steering angle signal $\theta_R$ during the reverse rotation of the motor rotation, i.e. actual return amount, to provide the actual return speed signal $\Delta\theta_R$, the obtains, from the motor rotation speed table 63, a target rotation speed corresponding the actual steering angle signal $\theta_R$, and thence generates the signal $\omega$ indicative of the thus-obtained target rotation speed. Then, in the motor-deceleration-amount calculation section 60, the target rotation speed $\omega$ is subtracted from the actual return speed $\Delta\theta_R$, and thereby the signal $\omega r$ indicative of the deceleration amount is output in accordance with a predetermined condition through the output gate 65. Technical significance of the above-mentioned subtracter 64 and output gate 65 is to perform control to decelerate the motor rotation by outputting the deceleration amount signal $\omega r$ only when the actual returning rotation speed, i.e. actual reversely-rotating speed ($\Delta\theta_R$), of the motor 120 is greater than the target rotation speed ($\omega$) considered to be capable of avoiding the interlocking jam in threaded engagement between the female and male threads; thus, when the actual returning rotation speed, i.e. actual reversely-rotating speed ($\Delta\theta_R$), of the motor 120 is not greater than the target rotation speed ($\omega$), such motor-rotation decelerating control is not performed through the operation of the subtracter 64 and output gate 65. Namely, only when the actual reverse rotation speed ($\Delta\theta_R$) of the motor 120 is greater than the target rotation speed ($\omega$), the deceleration amount signal $\omega r$ is output such that the reverse-motor-rotation decelerating control of the invention is effected to avoid occurrence of the undesired interlocking jam.

The following paragraphs describe the detailed contents of the motor rotation speed table 63 with reference to FIG. 9. The motor rotation speed table 63 is a conversion table based on particular steering-angle-to-rotation-speed characteristics, where the horizontal axis (abscissa) represents various possible values of the actual steering angle ($\theta_R$) while the vertical axis (ordinate) represents various values of the target rotation speed ($\omega$) corresponding to the actual steering angle ($\theta_R$). The actual steering angle ($\theta_R$) on the horizontal axis can take both positive and negative values. The motor rotation speed table 63, which is illustratively shown in FIG. 9 as having two separate characteristics 63a and 63b for setting a target rotation speed, can be provided by storing one of the steering-angle-to-rotation-speed conversion characteristics 63a and 63b in memory. The target rotation speed that can be obtained in correspondence with the input actual steering angle on the basis of the stored steering-angle-to-rotation-speed conversion characteristic represents a desirable target rotation speed of the motor 120 capable of avoiding occurrence of the interlocking jam in threaded engagement between the female and male threads. Therefore, for every rotation speed of the motor 120 higher than the target rotation speed set in correspondence with the input actual steering angle on the basis of the stored steering-angle-to-rotation-speed conversion characteristic 63a or 63b, the rotation of the motor 120 has to be decelerated to avoid the interlocking jam in threaded engagement between the female and male threads. Which one of the steering-angle-to-rotation-speed conversion characteristics 63a and 63b should be stored as the motor rotation speed map or table generally depends on the purpose of the rear-wheel steering control; that is, one of the steering-angle-to-rotation-speed conversion characteristics 63a and 63b to be stored in memory may be selected as desired. In an alternative, both of the steering-angle-to-rotation-speed conversion characteristics 63a and 63b may be stored in memory so that either one of the stored steering-angle-to-rotation-speed conversion characteristics can be used selectively.

The first steering-angle-to-rotation-speed conversion characteristic 63a is designed as follows. Namely, in the positive value range of the actual steering angle $\theta_R$, the first steering-angle-to-rotation-speed conversion characteristic 63a presents a linearly proportional characteristic with a positive inclination such that the target rotation speed $\omega$ is caused to become progressively higher at a constant rate as the value of the actual steering angle $\theta_R$ increases and a minimum rotation speed value $\omega$min is provided when the actual steering angle $\theta_R$ is of a value "0". In the negative value range of the actual steering angle $\theta_R$, the first steering-angle-to-rotation-speed conversion characteristic 63a presents a linearly proportional characteristic with a negative inclination such that the target rotation speed $\omega$ is caused to become progressively higher at a constant rate as the value of the actual steering angle $\theta_R$ decreases from "0". According to the first steering-angle-to-rotation-speed conversion characteristic 63a, a maximum rotation speed value $\omega$max is provided when the actual steering angle $\theta_R$ is "θ2" or "θ7" and, as noted above, the minimum rotation speed value $\omega$min is provided when the actual steering angle $\theta_R$ is "0", so that a target rotation speed value ($\omega$) corresponding to the actual steering angle is obtained from within a first deceleration amount setting range from "θ2" to "θ7". Thus, the actual returning rotation speed and target rotation speed of the motor 120 are compared for the first deceleration amount setting range.

The second steering-angle-to-rotation-speed conversion characteristic 63b, on the other hand, is designed as follows. Namely, in the positive value range of the actual steering angle $\theta_R$, the second steering-angle-to-rotation-speed conversion characteristic 63b presents a linearly proportional characteristic with a positive inclination such that the target rotation speed $\omega$ is caused to become progressively higher at a constant rate as the value of the actual steering angle $\theta_R$ increases from "θ3" and a minimum rotation speed value $\omega$min is provided when the actual steering angle $\theta_R$ is in the range of values "0" to "θ3". In the negative value range of the actual steering angle $\theta_R$, the second steering-angle-to-rotation-speed conversion characteristic 63b presents a linearly proportional characteristic with a negative inclination such that the target rotation speed $\omega$ is caused to become progressively higher at a constant rate as the value of the actual steering angle $\theta_R$ decreases from "θ8" and the minimum rotation speed value $\omega$min is provided when the actual steering angle $\theta_R$ is in the range of values "0" to "θ8". According to the second steering-angle-to-rotation-speed conversion characteristic 63b, a maximum rotation speed value $\omega$max is provided when the actual steering angle $\theta_R$ is "θ1" or "θ6" and the minimum rotation speed value $\omega$min is provided when the actual steering angle $\theta_R$ is in the range of "θ8" to "θ3", so that a target rotation speed value ($\omega$) corresponding to the actual steering angle is obtained from within a second deceleration amount setting range from "θ6" to "θ1". Thus, the actual returning rotation speed and target rotation speed of the motor 120 are compared for the second deceleration amount setting range.

As noted above, the motor rotation speed table 63 is a map where various target rotation speed values $\omega$ are registered, using the positive and negative actual steering angle values $\theta_R$ as addresses, in such a way to describe the steering-angle-to-rotation-speed correspondence based on the steering-angle-to-rotation-speed conversion characteristic 63a or 63b. Once the input value of the actual steering angle $\theta_R$ of the rear wheels 161 and 162 has fallen within the predetermined (first or second) deceleration amount setting range, the motor-deceleration-amount calculation section 60 reads out a corresponding target rotation speed value $\omega$ from the motor rotation speed table 63 and subtracts the read-out target rotation speed value $\omega$ from the actual returning rotation speed, i.e. actual reverse rotation speed ($\Delta\theta_R$), of the motor 120.

As noted above, which one of the steering-angle-to-rotation-speed conversion characteristics 63a and 63b should be used as the motor rotation speed map or table generally depends on the purpose of the rear-wheel steering control. These steering-angle-to-rotation-speed conversion characteristics 63a and 63b are designed differently such that the target rotation speed value $\omega$ read out from the first steering-angle-to-rotation-speed conversion characteristic 63a for an input actual steering angle value $\theta_R$ is greater than that read out from the second steering-angle-to-rotation-speed conversion characteristic 63b for the same input actual steering angle value $\theta_R$. Further, the second steering-angle-to-rotation-speed conversion characteristic 63b has a dead zone in the range of the actual steering angle values "θ8" to "θ3" where the target rotation speed value $\omega$ is kept at a constant minimum value, while first steering-angle-to-rotation-speed conversion characteristic 63a has no such a dead zone. It should be appreciated, however, the steering-angle-to-rotation-speed conversion characteristics for use in the instant embodiment are not necessarily limited to the above-described conversion characteristics 63a and 63b, and any other desired steering-angle-to-rotation-speed conversion characteristics may be selected according the steering characteristics of the rear-wheel steering apparatus 110.

When the rear wheels 161 and 162 being directed straight ahead are to be turned right or left in response to the steering instruction signal S1, the motor drive signal $I_M$ governing the rotating operation of the motor 120 is produced on the basis of the signal $\Delta\theta r$ having been subjected to the PID processing by the PID arithmetic operation section 42, in order to displace the steering rod 150 outwardly from the neutral position. As the motor 120 rotates in accordance with the motor drive signal $I_M$. the outer rotational-force-transmitting cylinder 131 of the linear drive mechanism 130 rotates as previously set forth, in response to which the left and right sliding cylinders 133 and 134 moves outward away from each other. In response to the outward movement of the sliding cylinders 133 and 134, the steering rod 150 is displaced in a direction determined by the clutching operation of inner clutch cylinders 143 and 144 based on the output signal from the steering-direction instruction section 30. As a consequence, the left and right rear wheels 161 and 162 are turned to assume a target steering angle θr.

Then, when the rear wheels 161 and 162 having been turned right or left in the above-mentioned manner are to be returned to the neutral or straight-ahead position, a target steering angle value θr of "0" is set on the basis of a newly input steering instruction signal S1, and a motor drive signal $I_M$ for reverse rotation of the motor 120 is generated by the steering-angle adjustment section 40. As the motor 120 rotates in the reverse direction in accordance with the reverse motor drive signal $I_M$, the outer rotational-force-transmitting cylinder 131 of the linear drive mechanism 130 rotates as previously set forth, in response to which the left and right sliding cylinders 133 and 134 moves inwardly toward each other. In response to the inward movement of the sliding cylinders 133 and 134, the steering rod 150 is axially displaced to the neutral position and consequently the rear wheels are turned back to the straight-ahead position. If the input value of the actual steering angle $θ_R$ of the rear wheels 161 and 162 falls within the predetermined (first or second) deceleration amount setting range during the reverse or return-to-neutral operation and if the actual reverse rotation speed ($Δθ_R$) of the motor 120 is greater than the target rotation speed (ω), the interlocking jam is very likely to occur between the female and male threads, so that the subtracter 43 subtracts the deceleration amount signal ωr from the PID-processed offset signal Δθr to produce the motor drive signal $I_M$, so that control is performed to decelerate the reverse rotation of the motor 120 in accordance with the motor drive signal $I_M$.

According to the above-mentioned reverse-motor-rotation decelerating control based on the motor drive signal $I_M$ produced by subtracting the deceleration amount signal ωr from the PID-processed difference or target control value signal Δθr, a target rotation speed value ω corresponding or proportional to the input actual steering angle value $θ_R$ is determined using the steering-angle-to-rotation-speed conversion characteristic (e.g., the conversion characteristic 63a or 63b) contained in the above-mentioned motor rotation speed table 63, then a deceleration amount ωr is determined, and thence the deceleration amount ωr is subtracted from the target control value Δθr to provide the motor drive signal $I_M$. This arrangement provides for the control to decelerate the reverse rotation of the motor 120 in the predetermined deceleration amount setting range close to the neutral position, thereby reliably avoiding the excessive screwing and resultant interlocking jam in threaded engagement between the female and male threads due to the inertial torque of the motor 120. As a consequence, the inventive control can reliably prevent the unwanted locking of the left and right sliding cylinders 133 and 134 and the clutch mechanisms.

Because the rear-wheel steering controller unit 10 is arranged to control the reverse rotation of the motor 120, for returning the rear wheels 161 and 162 to the straight-ahead position, when the actual rotating speed of the motor 120 is greater than the target rotation speed in the predetermined deceleration amount setting range, the left and right sliding cylinders 133 and 134 can be stopped smoothly at their respective neutral positions without hitting the other mechanical components, and the unwanted interlocking jam in threaded engagement between the female and male threads can be reliably avoided.

The basic principle of the above-mentioned reverse-motor-rotation decelerating control, which is based on the operation of the steering-angle adjustment section 40 and motor-deceleration-amount calculation section 60 in the controller unit 10 according to the first embodiment of the present invention, can be applied as follows.

When the rear wheels 161 and 162 are to be turned left or right at a predetermined maximum steering angle by the rear-wheel steering apparatus 110, the sliding cylinders are displaced to and positioned at their respective outermost positions by means of mechanical stoppers provided on the casing. Thus, in this situation too, there would occur unwanted locking of the sliding cylinders by the mechanical stoppers due to the inertia of the motor 120 unless no particular preventive measures are taken. Thus, the rear-wheel steering controller unit 10 shown in FIGS. 1, 7 and 8 is constructed to prevent such unwanted locking of the sliding cylinders by the mechanical stoppers at the outermost positions, i.e. at the maximum steering angle of the rear wheels. However, for this purpose, the motor rotation speed table 63 contains an additional steering-angle-to-rotation-speed conversion characteristic 163a or 163b as illustratively shown in FIG. 10. Third deceleration amount setting range of "θ12" to "$θ_M$" and "θ17" to "$θ_M$" is defined by the steering-angle-to-rotation-speed conversion characteristic 163a, while a fourth deceleration amount setting range of "θ11" to "$θ_M$" and "θ16" to "$θ_M$" where a minimum target rotation speed value ωmin is provided in response to "θ13" to "$θ_M$" or "θ18" to "$θ_M$" is defined by the steering-angle-to-rotation-speed conversion characteristic 163b. In this case, the motor-rotation decelerating control for preventing unwanted locking of the sliding cylinders by the mechanical stoppers at the outermost positions (i.e., at the maximum steering angle of the rear wheel 161 and 162) carries out the deceleration amount calculating operations on condition that the input signal to the input gate 61 of the motor-deceleration-amount calculation section 60 indicates that the motor 120 is rotating in the forward direction. When the actual steering angle $θ_R$ of the rear wheels 161 and 162, steered by the steering apparatus 110 under the control of the controller unit 10, has become great enough to fall in the predetermined deceleration amount setting range (i.e., the third or fourth deceleration amount setting range) close to a maximum actual steering angle, the controller unit 10 compares the actual rotation speed $Δθ_R$ of the motor and the target rotation speed ω obtained from the table 63 in accordance with the steering-angle-to-rotation-speed conversion characteristic 163a or 163b and, if the actual rotation speed $Δθ_R$ is higher than the target rotation speed ω, performs the motor-rotation decelerating control in the above-described manner. Namely, the motor drive signal $I_M$ is reduced in value to decelerate the rotation of the motor 120, so as to avoid occurrence of the locking jam at the maximum steering angle of the rear wheels.

Figure 10:
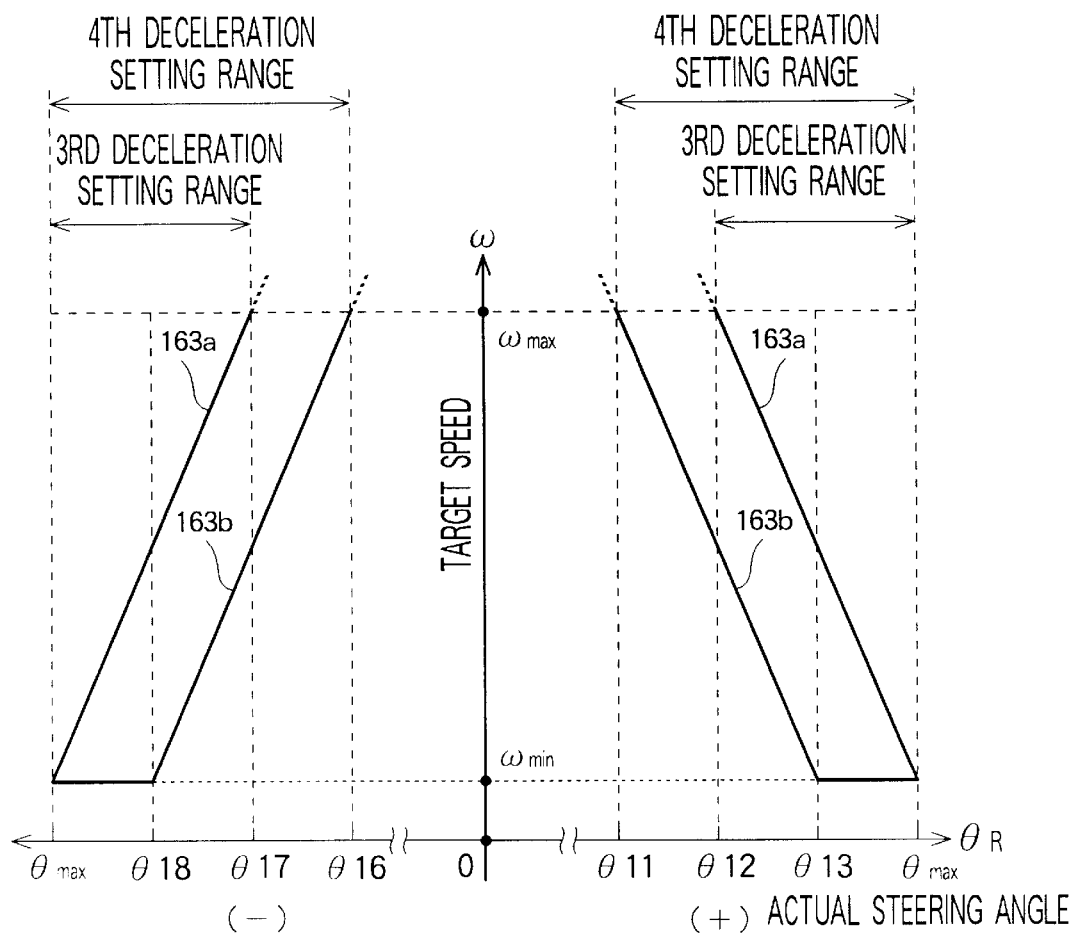
FIG. 10 is a graph showing other examples of steering-angle-to-rotation-speed conversion characteristics stored in the motor rotation speed table.

By providing the motor rotation speed table 63 containing the steering-angle-to-rotation-speed conversion characteristics of FIGS. 9 and 10 and by providing a section for detecting various situations in the outward steering operations responsive to a steering angle and return-to-neutral operation, the inventive rear-wheel controller unit 10 can reliably avoid the interlocking jam problem in any of the cases. Note that the subtracter 43 in the controller unit 10 may be provided in any other suitable position than shown in FIG. 7; for example, the subtracter 43 may be provided before the PID arithmetic operation section 42.

Figure 11:
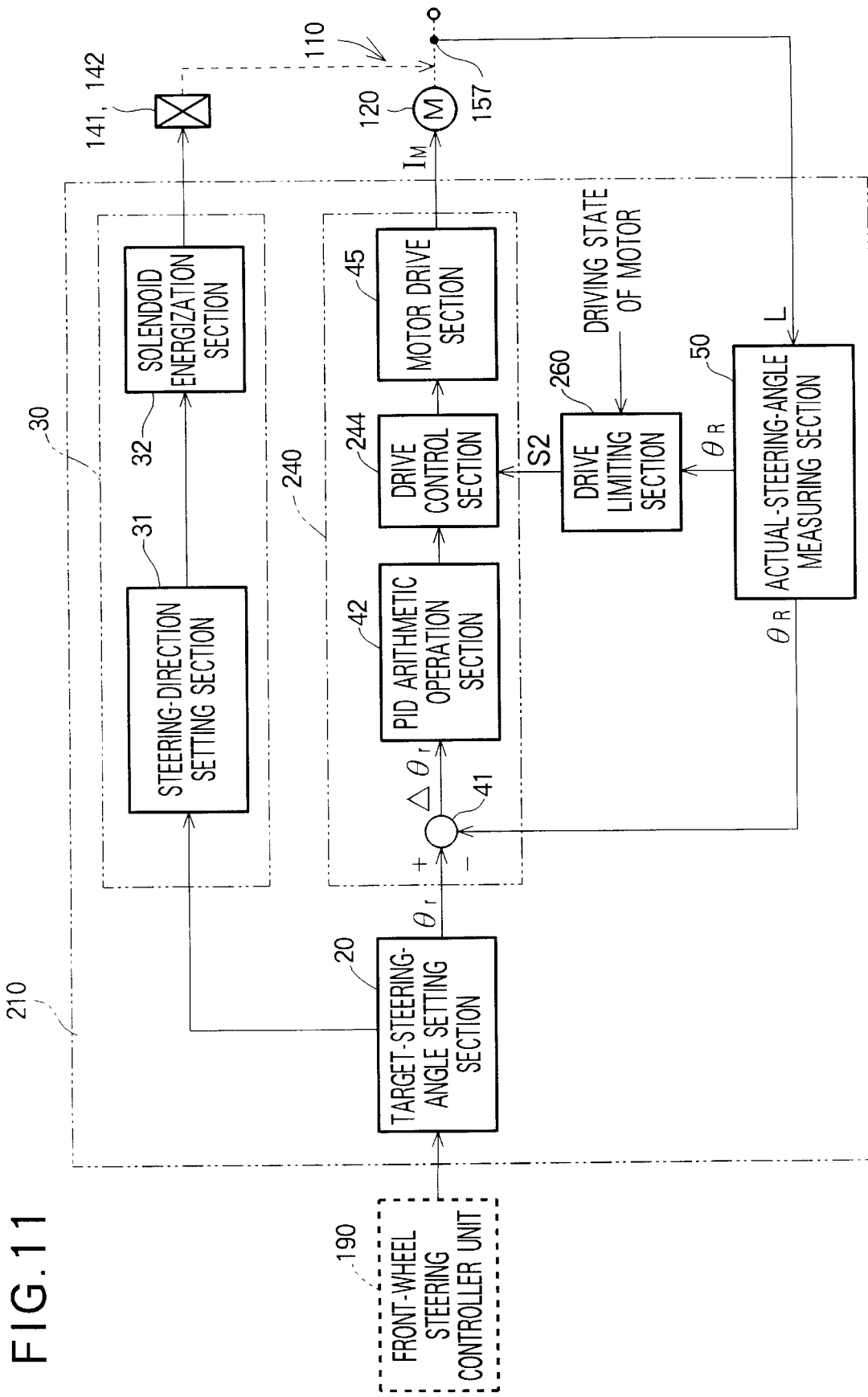
FIG. 11 is a block diagram showing a controller unit in accordance with a second preferred embodiment of the present invention.

Now, a second embodiment of the present invention will be described with reference to FIGS. 11 and 12, of which FIG. 11 is similar to FIG. 7. In FIG. 11, elements substantially similar in construction and function to the counterparts of FIG. 7 are represented by the same reference characters and will not be described here to avoid unnecessary duplication. Rear-wheel steering controller unit 210 in accordance with the second embodiment differs from the first embodiment in that it includes a steering-angle adjustment section 240 and a motor drive limiting section 260 that are constructed differently from the steering-angle adjustment section 40 and motor drive control section 44 of FIG. 7. Exemplary details of the motor drive limiting section 260 is shown in FIG. 12.

The steering-angle adjustment section 240 of FIG. 11 includes a subtracter 41, a PID arithmetic operation section 42, the above-mentioned motor drive control section 244, and a motor drive section 45. The subtracter 41, PID arithmetic operation section 42 and motor drive section 45 are similar to those already described in relation to the first embodiment and hence are represented by the same reference numerals. Namely, the output signal from the PID arithmetic operation section 42 (corresponding to Δθr) is passed to the motor drive control section 244, in response to which the motor drive control section 244 generates a PWM (Pulse Width Modulation)-controlled signal to be fed to the motor drive section 45 that converts the signal into the motor drive signal $I_M$ for rotating the motor 120. The motor drive control section 244 includes a switch activatable for stopping the generation and output of the PWM-controlled signal. The on/off state of the switch in the motor drive control section 244 is controlled by a signal S2 given from the motor drive limiting section 260. For example, the switch may be an output gate that is turned on simultaneously with activation of the motor drive control section 244 and turned off when the value of the signal S2 has turned to "1".

Figure 12:
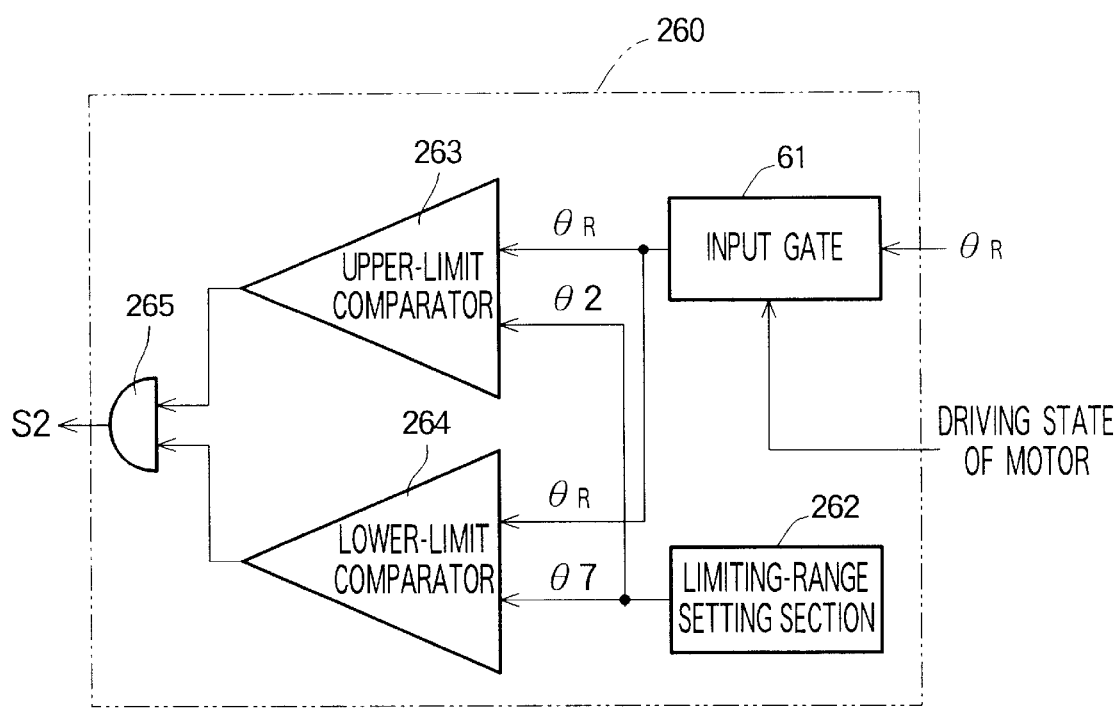
FIG. 12 is a block diagram showing exemplary details of a motor drive limiting section shown in FIG. 11.

As illustratively shown in FIG. 12, the motor drive limiting section 260 includes an input gate 61, a limiting-range setting section 262, upper-limit and lower-limit comparison sections 263 and 264 each having two input terminals, and an AND gate 265. The input gate 61 is similar to the counterpart described earlier in relation to the first embodiment, which passes the actual steering angle signal $\theta_R$ on condition that the motor 120 is in a predetermined driving state (e.g., reversely-rotating state). The actual steering angle signal $\theta_R$ having passed through the input gate 61 is applied to one of the two input terminals in each of the upper-limit and lower-limit comparison sections 263 and 264, and output signals, representing maximum and minimum steering angle values, from the limiting-range setting section 262 are applied to the other input terminal in each of the upper-limit and lower-limit comparison sections 263 and 264. Thus, the upper-limit comparison section 263 compares the actual steering angle $\theta_R$ and the maximum steering angle from the limiting-range setting section 262 and outputs a positive logical value "1" when the actual steering angle $\theta_R$ is smaller than the maximum steering angle. Similarly, the lower-limit comparison section 264 compares the actual steering angle $\theta_R$ and the minimum steering angle from the limiting-range setting section 262 and outputs a positive logical value "1" when the actual steering angle $\theta_R$ is greater than the minimum steering angle. Respective outputs of the upper-limit and lower-limit comparison sections 263 and 264 are applied to input terminals of the AND gate 265. Only when the outputs from the upper-limit and lower-limit comparison sections 263 and 264 are "1", the signal S2 output from the AND gate 265 takes a value "1", in response to which the above-mentioned switch in the motor drive control section 244 is turned off.

The "motor-rotation limiting range", which is set via electronic circuitry comprised of the limiting-range setting section 262, upper-limit and lower-limit comparison sections 263 and 264 and AND gate 265, corresponds to any one of the first to fourth deceleration amount setting ranges defined by the steering-angle-to-rotation-speed conversion characteristics 63a, 63b, 163a and 163b of FIGS. 9 and 10. The "motor-rotation limiting range" as used here represents a range over which the rotation of the motor 120 is ceased or limited provided that the actual steering angle of the rear wheels 161 and 162, steered or returned through the motor rotation, falls within that range. Namely, when the actual steering angle of the rear wheels 161 and 162 falls within the first deceleration amount setting range, the rear-wheel steering controller unit 210 controls such that the output signal S2 from the AND gate 265 becomes "1" and thus the motor drive signal $I_M$ assumes a value "0" to thereby cease the rotation of the motor 120.

Which of the above-mentioned first to fourth deceleration amount setting ranges should be used as the motor-rotation limiting range may be determined in accordance with the purpose of the rear-wheel steering control. If the first deceleration amount setting range is used as the motor-rotation limiting range, "θ2" is set as the maximum steering angle and "θ7" is set as the minimum steering angle. Similarly, if the second deceleration amount setting range is used as the motor-rotation limiting range, "θ1" is set as the maximum steering angle and "θ6" is set as the minimum steering angle. Further, if the third deceleration amount setting range is used as the motor-rotation limiting range, "θmax" is set as the maximum steering angle and "θ12" is set as the minimum steering angle for the positive value range, while "θ17" is set as the maximum steering angle and "negative θmax" is set as the minimum steering angle for the negative value range. Furthermore, if the fourth deceleration amount setting range is used as the motor-rotation limiting range, "θmax" is set as the maximum steering angle and "θ11" is set as the minimum steering angle for the positive value range, while "θ16" is set as the maximum steering angle and "negative θmax" is set as the minimum steering angle for the negative value range.

As noted above, the instant embodiment controls the rear wheel steering by appropriately setting the maximum and minimum steering angles via the limiting-range setting section 262 and thereby selecting any one of the first to fourth deceleration amount setting ranges as the motor-rotation limiting range. Then, once the motor has reached such a driving state presenting a very high likelihood of causing the above-mentioned interlocking jam, the rotation of the motor 120 is ceased by causing the signal S2 to assume the "1" value. Namely, when the actual steering angle of the rear wheels 161 and 162 falls within the selected deceleration amount setting range, the rear-wheel steering controller unit 210 performs control such that the output signal S2 from the AND gate 265 becomes "1", the switch in the motor drive control section 244 turns off and thus the motor drive signal $I_M$ assumes the "0" value to thereby cease the rotation of the motor 120.

Once the rotation of the motor 120 has been ceased in the above-mentioned manner, the rotational torque of the outer rotational-force-transmitting cylinder 131 in the linear drive mechanism 130 is lost suddenly. This arrangement of the second embodiment can reliably prevent the unwanted interlocking between the left and right sliding cylinders 133 and 134 and the clutch cylinders 140L and 140R.

Whereas the controller unit 210 according to the second embodiment has been described above as setting the maximum and minimum steering angles by means of the limiting-range setting section 262 and then setting any one of the first to fourth deceleration amount setting range as the motor-rotation limiting range, two or more of the deceleration amount setting ranges, e.g. the first and second deceleration amount setting ranges, may be set and used at the same time. In such a case, it is preferred that a particular section be provided for distinguishing between the forward and reverse rotations of the motor 120 turning the rear wheels 161 and 162 leftward or rightward so that the rotation of the motor 120 can be stopped at accurate timing.

Note that any other suitable deceleration amount setting range than the above-mentioned first to fourth deceleration amount setting ranges may be selected as the motor-rotation limiting range, depending on the purpose of the rear-wheel steering control.

Further, in the above-described embodiment, the motor drive signal $I_M$ may be limited to a sufficiently small value other than "0" for ceasing the rotation of the motor 120. Furthermore, the maximum value of the duty cycle for controlling the rotation of the motor 120 may be limited, instead of providing the switch in the motor drive control section 244. Thus limiting the motor drive signal $I_M$ or duty cycle can reduce the number of the necessary components for the motor rotation control and achieves significantly simplified construction.

Figure 13:
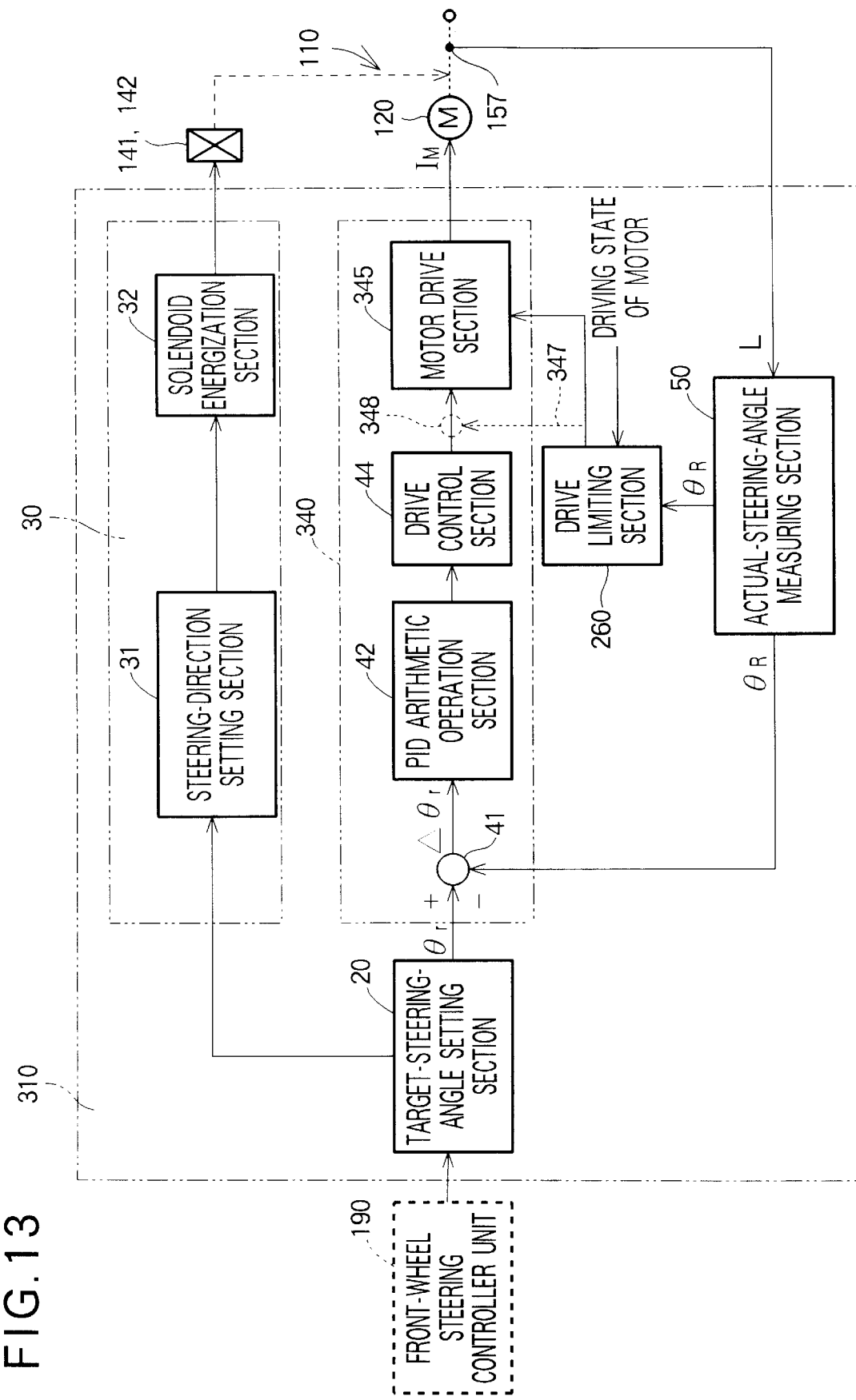
FIG. 13 is a block diagram showing a controller unit in accordance with a third preferred embodiment of the present invention.

Now, a third embodiment of the present invention will be described with reference to FIGS. 13 to 15. Similarly to the above-described second embodiment, a rear-wheel steering controller unit 310 in accordance with the third embodiment has a function of stopping the rotation of the motor 120 when there is likelihood of an interlocking jam occurring between the outer rotational-force-transmitting cylinders 131 and the left and right sliding cylinders 133 and 134 in the linear drive mechanism 130. However, the third embodiment is different from the second embodiment in that the former is arranged to compulsorily stop the rotation of the motor 120, using the self-power-generating action of the motor 120, to thereby enhance the motor rotation stopping capability. In FIG. 13, elements substantially similar in construction and function to the counterparts of FIGS. 7 and 11 are represented by the same reference characters and will not be described here to avoid unnecessary duplication. Specifically, the rear-wheel steering controller unit 310 in accordance with the third embodiment differs from the second embodiment in that it includes a steering-angle adjustment section 340 constructed differently from the steering-angle adjustment section 240 of the second embodiment. The steering-angle adjustment section 340 of FIG. 13 includes a subtracter 41, a PID arithmetic operation section 42, a motor drive control section 44, and a motor drive section 345. The subtracter 41, PID arithmetic operation section 42 and motor drive control section 44 are similar in construction to the counterparts of the first embodiment. The rear-wheel steering controller unit 310 also includes a motor drive limiting section 260 that is similar in construction and operation to the counterpart of the second embodiment. Namely, the motor drive limiting section 260 in this embodiment provides an output S2 signaling the timing to stop the rotation of the motor 120. The output signal S2 is produced in the same manner described earlier with reference to FIG. 12.

Figure 14:
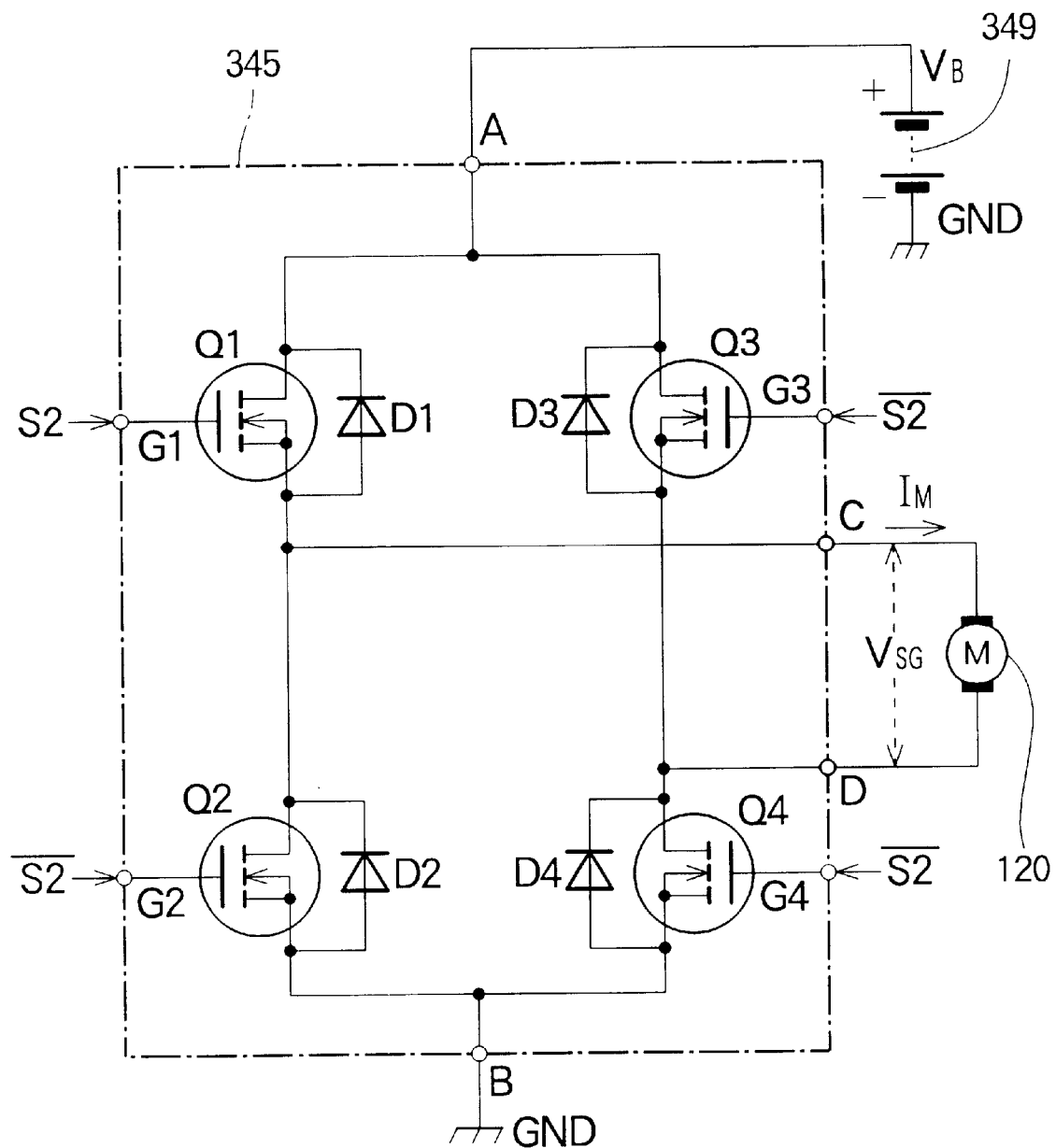
FIG. 14 is a circuit diagram showing exemplary details of a motor drive section shown in FIG. 13.

The following paragraphs describe exemplary details of the motor drive section 345 with reference to FIG. 14. As shown, the motor drive section 345 comprises a motor-driving bridge circuit comprised of four field effect transistors (FET) Q1 to Q4 each functioning as a switch element. Bypass diode D1–D4 is connected between the drain and source of each of the field effect transistors Q1 to Q4. In the motor-driving bridge circuit, one terminal A is connected to a power supply (battery) 349 of positive voltage $V_B$, and another terminal is connected to a ground (GND). The motor 120 is connected between intermediate output terminals C and D. Further, a signal S2 or inverted version of the signal S2 is applied to the gates G1 to G4 of the field effect transistors Q1 to Q4 to turn on or off the individual transistors Q1 to Q4.

In normal rear-wheel steering operation, the motor drive section 345, comprising the motor-driving bridge circuit, passes a pulse-width-modulation-controlled signal from the motor drive control section 44 to the four field effect transistors Q1 to Q4 in such a manner to satisfy a predetermined logical condition, to thereby control the rotation (rotating direction (forward or reverse direction) and rotating speed) of the motor 120. Namely, if the pulse-width-modulation-controlled signal is applied to the respective gates of the transistors Q1 and Q4 with no signal applied to the gates of the transistors Q2 and Q3, an electric current based on the motor drive signal $I_M$ is fed to the motor 120 to rotate the motor 120 in the forward direction. If, on the other hand, the pulse-width-modulation-controlled signal is applied to the respective gates of the transistors Q2 and Q3 with no signal applied to the gates of the transistors Q1 and Q4, a reverse electric current based on the motor drive signal $I_M$ is fed to the motor 120 to rotate the motor 120 in the reverse direction.

Namely, in the instant embodiment, the rotation of the motor 120 and hence steering of the rear wheels 161 and 162 are controlled by controlling the respective on/off states of the transistors Q1 and Q4, constituting the motor drive section 345, in accordance with the output signal from the motor drive control section 44. Once the signal S2 turns to a value "1" as a result of the actual steering angle of the rear wheels 161 and 162 having fallen within a predetermined deceleration amount setting range set by the motor drive limiting section 260 when the motor 120 is rotating in the forward direction to turn the rear wheels 161 and 162 leftward or rightward, the signal S2 is applied, as positive logic, to the gate G1 of the field effect transistor Q1, while the inverted version of the signal S2 (logical value "0") is applied to the remaining field effect transistors Q2 to Q4. Thus, only the transistor Q1 is turned on with the other transistors Q2 to Q4 turned off, as a result of which a closed circuit made up of the terminal D, back-flow bypass diode D3, field effect transistor Q1, terminal C and motor 120 is formed in the order mentioned and thus a counter electromotive force $V_{SG}$ is induced in the motor 120 on the basis of the rotation of the motor 120. Once such a counter electromotive force $V_{SG}$ is induced, the rotation of the motor 120 is suppressed compulsorily, which results in abrupt loss of the rotational torque of the outer rotational-force-transmitting cylinder 131 in the linear drive mechanism 130. As a consequence, the movement of the sliding cylinders 133 and 134 can be decelerated compulsorily in an extremely short time, to thereby reliably avoid the unwanted locking of the left and right sliding cylinders 133 and 134 and the clutch mechanisms.

Further, when the motor 120 rotating in the reverse direction is to be stopped, the signal S2 of the logical value "1" is applied to the gate G3 of the field effect transistor Q3 and the inverted version of the signal S2 is applied to the other transistors Q1, Q2 and Q4, so that a closed circuit made up of the terminal C, back-flow bypass diode D1, field effect transistor Q3, terminal D and motor 120 is formed in the order mentioned and thus an electromotive force is induced in the motor 120 so that torque to compulsorily cease the reverse rotation of the motor 120 is produced in the motor 120.

Figure 15:
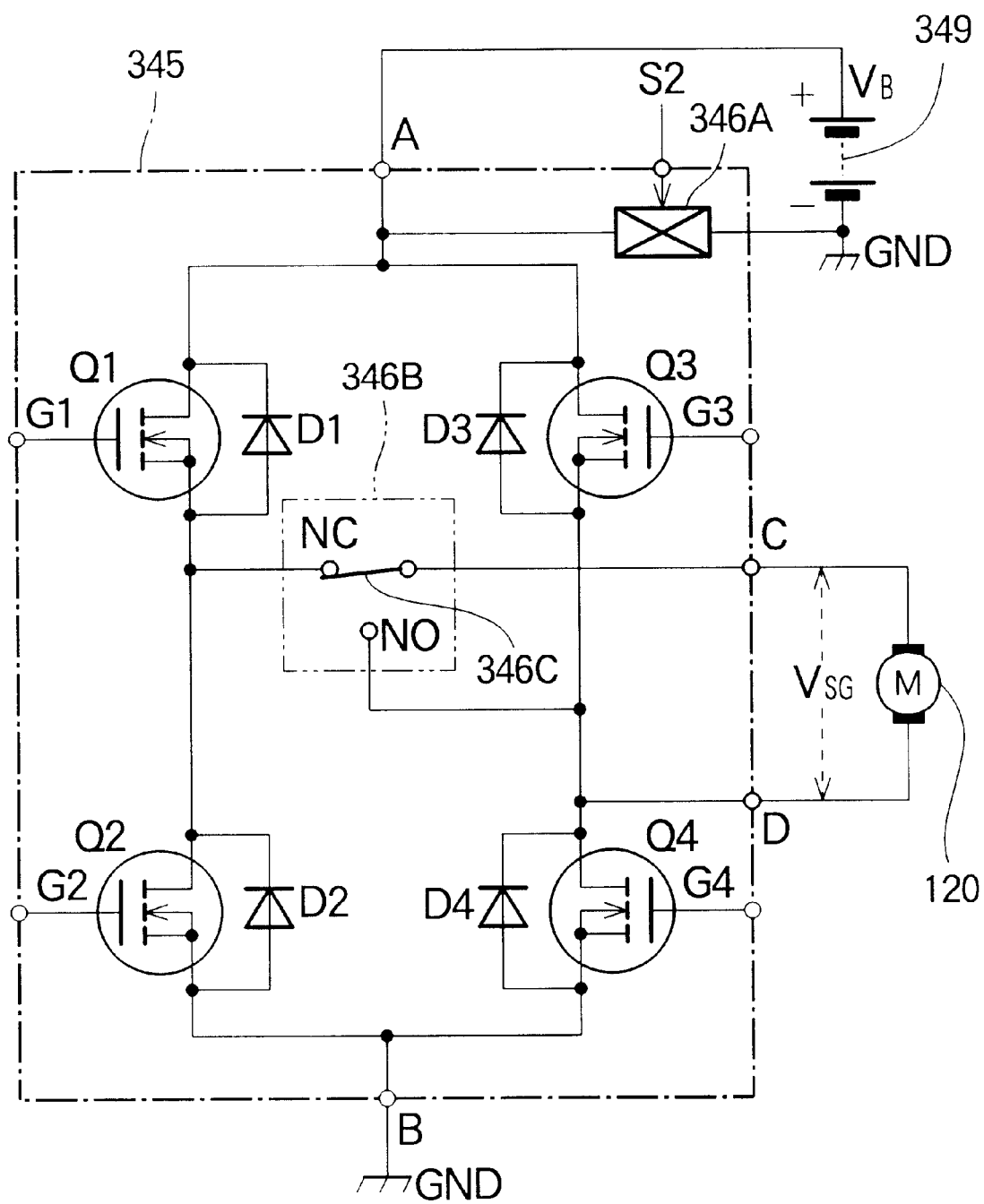
FIG. 15 is a circuit diagram showing a modification of the third embodiment, which particularly shows a modified example of the motor drive section of FIG. 13.

FIG. 15 is a circuit diagram showing a modification of the third embodiment, which particularly shows a modified example of the motor drive section 345. In FIG. 15, elements substantially similar in construction and function to the counterparts of FIG. 14 are represented by the same reference characters and will not be described here to avoid unnecessary duplication. Specifically, the modified motor drive section 345 of FIG. 15 is characterized by including a relay drive section 346A and a relay contact section 346B. The relay drive section 346A includes an excitable coil and is connected between the terminal A and the ground. The relay contact section 346B includes a normally-closed contact terminal NC, a normally-open contact terminal NO connected to the terminal D, and a movable contact 346C connected at one end to the terminal C. The movable contact 346C is normally connected at the other end to the normally-closed contact terminal NC. In this instance, the motor drive section 345 functions as a normal motor-driving bridge circuit for supplying a drive current to the motor 120.

Once the signal S2 output from the motor drive limiting section 260 has turned to the logical value "1", the signal S2 is given, as positive logic, to the relay drive section 346A in the motor drive section 345 of FIG. 15 so that the relay drive section 346A is activated. Upon activation of the relay drive section 346A by the signal S2, excitation occurs in such a manner that the movable contact 346C is connected to the normally-open contact terminal NO. As a consequence, a closed electric circuit is formed for the motor 120, so that the motor 120 operates as an electric power generator, and the self-power-generating action of the motor 120 produces a braking load to cease the rotation of the motor 120. This way, the rotation of the motor 120 is decelerated rapidly, which can effectively avoid the above-mentioned unwanted interlocking jam.

The embodiments have been described above as passing the output signal S2 from the motor drive limiting section 260 to the motor drive control section 244 or motor drive section 345. In an alternative, the signal S2 may be sent to an opening/closing section 348 provided between the motor drive control section 44 and the motor drive section 345 so as to cause the opening/closing section 348 to close when the signal S2 has turned to the value "1", as depicted by broken line in FIG. 13. This alternative too can prevent excessive rotation of the motor 120 to thereby avoid the above-mentioned interlocking jam problem.

Figure 16:
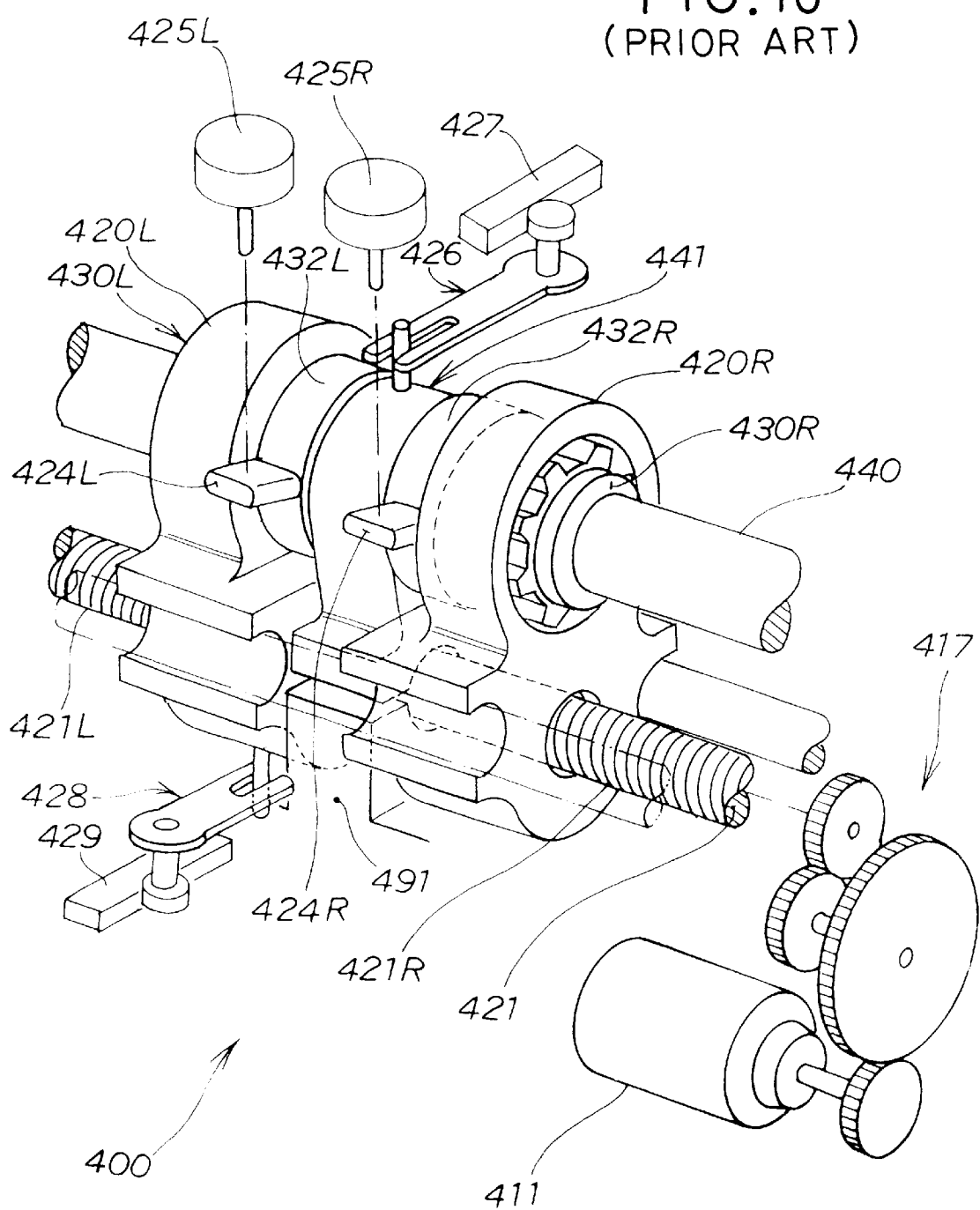
FIG. 16 is an exploded perspective view explanatory of mechanical construction of a conventional rear-wheel steering apparatus.
Figure 17:
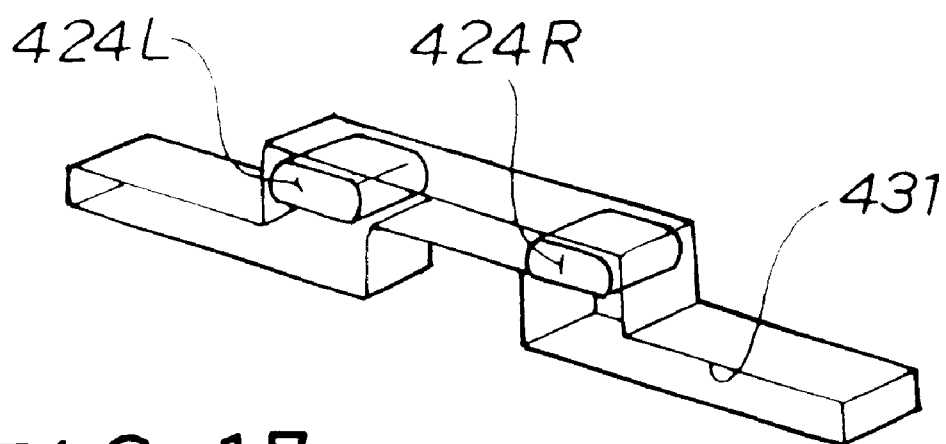
FIG. 17 is a perspective of a clutch lever guide groove formed in a casing of the conventional rear-wheel steering apparatus shown in FIG. 16.
Figure 18:
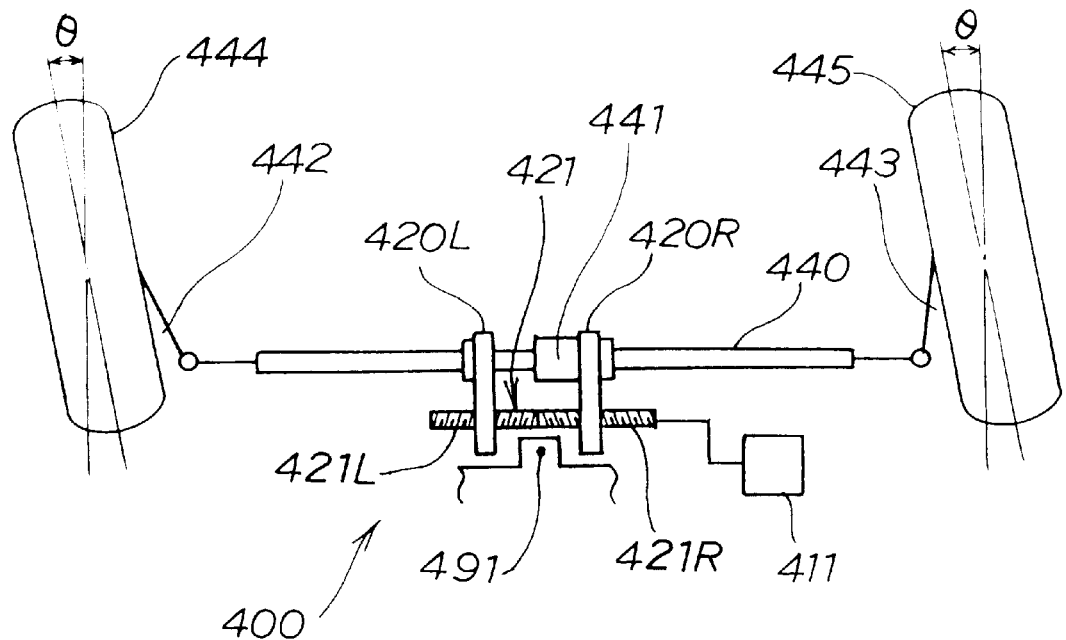
FIG. 18 is a schematic top plan view of the conventional rear-wheel steering apparatus turning the rear wheels relative to a straight-ahead position.
Figure 19:
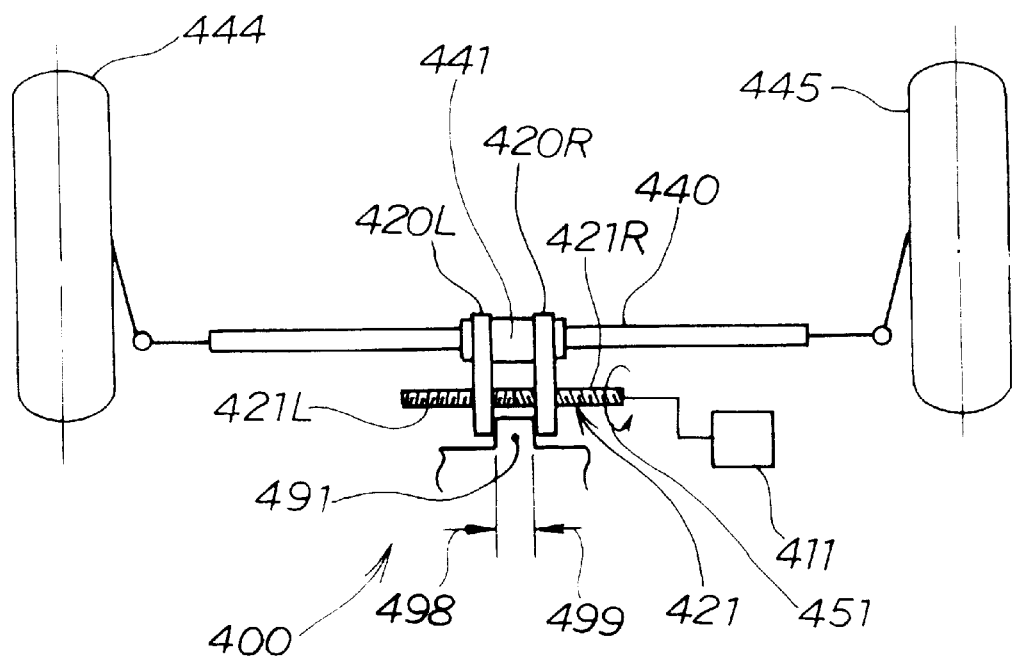
FIG. 19 is a schematic top plan view of the conventional rear-wheel steering apparatus keeping the rear wheels in the straight-ahead position.
Figure 20:
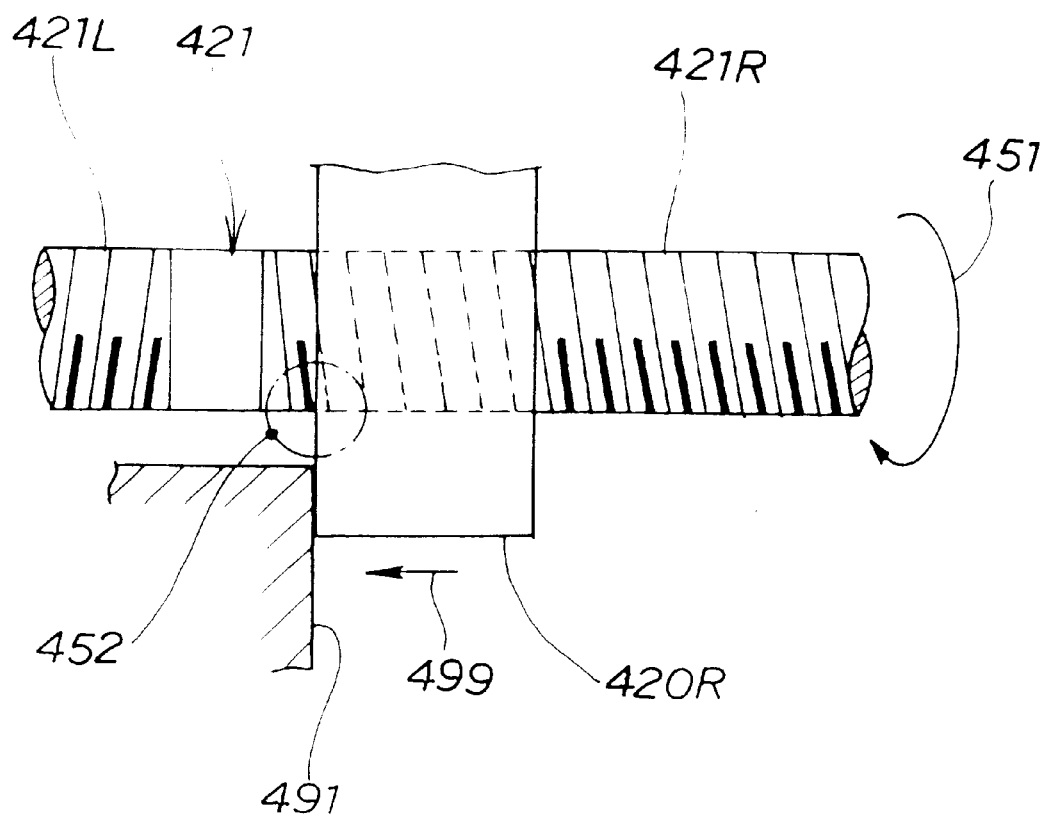
FIG. 20 is an enlarged fragmentary view showing a right slide block brought into pressing contact with a right end surface of a stopper in the conventional rear-wheel steering apparatus.
Figure 21:
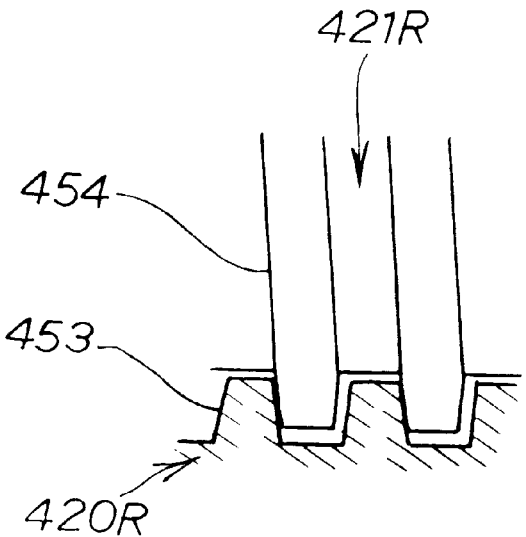
FIG. 21 is an enlarged fragmentary view showing proper engagement between female and male thread portions in the conventional rear-wheel steering apparatus.
Figure 22:
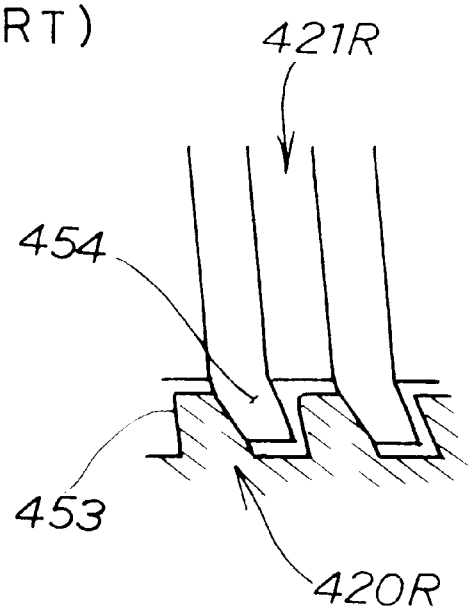
FIG. 22 is an enlarged fragmentary view showing improper engagement between the female and male thread portions in the conventional rear-wheel steering apparatus.

Whereas the various preferred embodiments have been described above as controlling the rear-wheel steering apparatus 110 of FIG. 2, the present invention may also be applied to the prior art rear-wheel steering apparatus constructed in the manner as shown in FIG. 16. Namely, although the preferred embodiments have been described above as performing control to avoid the interlocking jam in turning the rear wheels to an outward position or back to the straight-ahead position, the inventive controller unit can be similarly applied to avoid the interlocking jam when the rear wheels are first steered to a halfway position and then further steered from the halfway position, by acquiring information indicative of a changing steered state.

The present invention arranged in the above-described manner affords significant and unique benefits, as may be apparent from the foregoing.

Namely, in the controller unit of the present invention, the rotating speed of the motor is evaluated immediately before the left and right sliding cylinders of the linear drive mechanism, having oppositely-threaded portions, reach their respective neutral positions or outmost positions as the steering rod is axially displaced, via the linear drive mechanism, to turn the rear wheels leftward or rightward, in such a manner that the rotation of the motor is decelerated or the motor drive signal is set to a zero value if the rotating speed of the motor is higher than a predetermined reference speed and thus likely to cause a distortion and interlocking jam of the left and right sliding cylinders. The controller unit of the present invention is also characterized by the provision of an electronic control circuit to rapidly decelerate the motor rotation utilizing self-power-generating action of the motor based on a counter electromotive force induced in the motor. With these structural features, the present invention can reliably avoid the interlocking jam in threaded engagement between the outer rotational-force-transmitting cylinder and the left and right sliding cylinders in the linear drive mechanism and between the sliding cylinders and the mechanical stoppers at the outermost positions, as well as the unwanted locking of the left and right sliding cylinders and the clutch mechanisms. As a result, the present invention provides for smooth rear-wheel steering.

Further, because the rear-wheel steering controller unit of the invention is designed to avoid, through electronic control, the interlocking jam from occurring in the return-to-neutral stroke, the present invention can provide a smoothly-operating rear-wheel steering apparatus for a four-wheel steering vehicle while achieving significant reduction in the overall size and weight of the apparatus.

Obviously, various minor changes and modifications of the present invention are possible in the light of the above teaching. It is therefore to be understood that within the scope of the appended claims the invention may be practiced otherwise than as specifically described.

What is claimed is:

1. A controller unit for a rear-wheel steering apparatus, said rear-wheel steering apparatus comprising: a motor; a rotational-force transmitting member rotatable in accordance with rotation of said motor; a pair of sliding members movable from respective central neutral positions, away from each other, to respective outward positions corresponding to a designated steering angle of rear wheels and movable from the outward positions, toward each other, back to the neutral positions; a threaded engagement section having oppositely-threaded portions and operatively connecting between said rotational-force transmitting member and said sliding members through threaded engagement in such a manner that said sliding members are caused to move away from or toward each other in response to rotation of said rotational-force transmitting member by said motor; a clutch mechanism for operatively connecting either one of said sliding members with a steering rod provided between the rear wheels; and a first stopper for defining the neutral positions of said sliding members and limiting respective inward movement of said sliding members, wherein with the one of said sliding members operatively connected with the steering rod via said clutch mechanism, the rear wheels are turned by a designated steering angle by moving said sliding members outwardly away from each other through rotation of said motor in a first direction and are returned to a straight-ahead position by moving said sliding members inwardly toward each other through rotation of said motor in a second direction reverse to said first direction, said controller unit comprising:
- a target-steering-angle setting section for setting a target steering angle of the rear wheels;
- an actual-steering-angle measurement section for measuring an actual steering angle of the rear wheels;
- a steering-angle adjustment section for, on the basis of the target steering angle set by said target-steering-angle setting section and the actual steering angle measured by said steering-angle adjustment section, generating a motor drive signal to control the rotation of said motor in such a manner that a difference between said target steering angle and said actual steering angle becomes zero, said steering-angle adjustment section supplying the motor drive signal to said motor so that, through the rotation of said motor based on the motor drive signal, said sliding members are moved to the outward positions when the rear wheels are to be turned by the designated steering angle or said sliding members are returned to the neutral positions when the rear wheels are to be turned back to the straight-ahead position; and
- a motor-deceleration-amount calculation section for, on condition that said motor is in a predetermined driving state, being activated to calculate an actual rotating speed of said motor on the basis of the actual steering angle of the rear wheels and comparing the calculated actual rotating speed of said motor and a prestored reference rotation speed, said motor-deceleration-amount calculation section calculating a motor-rotation deceleration amount when the calculated actual rotating speed is higher than the reference rotation speed,
    wherein said steering-angle adjustment section includes a subtracter for subtracting the motor-rotation deceleration amount from the motor drive signal.

2. A controller unit for a rear-wheel steering apparatus as claimed in claim 1 wherein said predetermined driving state of said motor is a state where said motor is rotating to return said sliding members to the neutral positions and said sliding members have entered a predetermined decelerating region close to the neutral positions, and wherein when said motor is in said predetermined driving state, the rotation of said motor is decelerated, in accordance with the motor-rotation deceleration amount calculated by said motor-deceleration-amount calculation section, immediately before said sliding members are stopped at the neutral positions.

3. A controller unit for a rear-wheel steering apparatus as claimed in claim 1 wherein said rear-wheel steering apparatus further includes second stoppers for defining respective outermost positions of said sliding members to limit outward movement of said sliding members, wherein said predetermined driving state of said motor is a state where said motor is rotating to move said sliding members to the outward positions and said sliding members have entered a predetermined decelerating region close to the outermost positions, and wherein when said motor is in said predetermined driving state, the rotation of said motor is decelerated, in accordance with the motor-rotation deceleration amount calculated by said motor-deceleration-amount calculation section, immediately before said sliding members are stopped at the outermost positions.

4. A controller unit for a rear-wheel steering apparatus as claimed in claim 1 wherein said motor-deceleration-amount calculation section includes an actual steering angle differentiator for calculating the actual rotating speed of said motor, and a motor rotation speed table for selectively providing a value of the reference rotation speed corresponding to the actual steering angle of the rear wheels measured by said actual-steering-angle measurement section.

5. A controller unit for a rear-wheel steering apparatus, said rear-wheel steering apparatus comprising: a motor; a rotational-force transmitting member rotatable in accordance with rotation of said motor; a pair of sliding members movable from respective central neutral positions, away from each other, to respective outward positions corresponding to a designated steering angle of rear wheels and movable from the outward positions, toward each other, back to the neutral positions; a threaded engagement section having oppositely-threaded portions and operatively connecting between said rotational-force transmitting member and said sliding members through threaded engagement in such a manner that said sliding members are caused to move away from or toward each other in response to rotation of said rotational-force transmitting member by said motor; a clutch mechanism for operatively connecting either one of said sliding members with a steering rod provided between the rear wheels; and a first stopper for defining the neutral positions of said sliding members and limiting respective inward movement of said sliding members, wherein with the one of said sliding members operatively connected with the steering rod via said clutch mechanism, the rear wheels are turned by a designated steering angle by moving said sliding members outwardly away from each other through rotation of said motor in a first direction and are returned to a straight-ahead position by moving said sliding members inwardly toward each other through rotation of said motor in a second direction reverse to said first direction, said controller unit comprising:
- a target-steering-angle setting section for setting a target steering angle of the rear wheels;
- an actual-steering-angle measurement section for measuring an actual steering angle of the rear wheels;
- a steering-angle adjustment section for, on the basis of the target steering angle set by said target-steering-angle setting section and the actual steering angle measured by said steering-angle adjustment section, generating a motor drive signal to control the rotation of said motor in such a manner that a difference between said target steering angle and said actual steering angle becomes zero, said steering-angle adjustment section supplying the motor drive signal to said motor so that, through the rotation of said motor based on the motor drive signal, said sliding members are moved to the outward positions when the rear wheels are to be turned by the designated steering angle or said sliding members are returned to the neutral positions when the rear wheels are to be turned back to the straight-ahead position; and
- a motor drive limiting section for, on condition that said motor is in a predetermined driving state and the actual steering angle of the rear wheels has entered a predetermined decelerating region, being activated to generate a motor drive limiting signal for limiting the rotation of said motor,
    wherein said steering-angle adjustment section adjusts the motor drive signal in accordance with the motor drive limiting signal to thereby decelerate the rotation of said motor.

6. A controller unit for a rear-wheel steering apparatus as claimed in claim 5 wherein said motor drive limiting signal is given to a motor drive control section provided in said steering-angle adjustment section for generating a PWM-controlled signal, and wherein generation of the PWM-controlled signal by said motor drive control section is stopped in accordance with the motor drive limiting signal.

7. A controller unit for a rear-wheel steering apparatus as claimed in claim 5 wherein said motor drive limiting signal is given to a motor-driving bridge circuit provided in said steering-angle adjustment section for generating the motor drive signal, and wherein an electrical connecting state within said motor-driving bridge circuit is varied, in accordance with the motor drive limiting signal, to thereby form a short-circuiting circuit for said motor such that the rotation of said motor is stopped compulsorily through self-power-generating operation of said motor.

8. A controller unit for a rear-wheel steering apparatus as claimed in claim 7 wherein respective on/off states of four switch elements constituting said motor-driving bridge circuit are controlled in accordance with the motor drive limiting signal, to thereby form said short-circuiting circuit for said motor.

9. A controller unit for a rear-wheel steering apparatus as claimed in claim 7 wherein said motor-driving bridge circuit includes a relay section to permit formation of said short-circuiting circuit, and said short-circuiting circuit is provided by controlling said relay section in accordance with the motor drive limiting signal.

10. A controller unit for a rear-wheel steering apparatus as claimed in claim 5 wherein said predetermined driving state of said motor is a state where said motor is rotating to return said sliding members to the neutral positions and said sliding members have entered a predetermined decelerating region close to the neutral positions, and wherein when said motor is in said predetermined driving state, said motor drive limiting section limits the rotation of said motor immediately before said sliding members are stopped at the neutral positions.

11. A controller unit for a rear-wheel steering apparatus as claimed in claim 5 wherein said rear-wheel steering apparatus further includes second stoppers for defining respective outermost positions of said sliding members to limit outward movement of said sliding members, wherein said predetermined driving state of said motor is a state where said motor is rotating to move said sliding members to the outward positions and said sliding members have entered a predetermined decelerating region close to the outermost positions, and wherein when said motor is in said predetermined driving state, said motor drive limiting section limits the rotation of said motor immediately before said sliding members are stopped at the outermost positions.

* * * * *